(12) United States Patent
Canada Codina et al.

(10) Patent No.: US 12,097,664 B2
(45) Date of Patent: *Sep. 24, 2024

(54) CONTINUOUS MOTION IMPULSE HEAT SEALING OF FILM MATERIAL

(71) Applicant: SIG SERVICES AG, Neuhausen am Rheinfall (CH)

(72) Inventors: Jordi Canada Codina, Barcelona (ES); Jordi Vidal Camps, Barcelona (ES); Juan Rojas Segura, Barcelona (ES); Abel Saez Lopez, Barcelona (ES); Laurens Last, SX Tilburg (NL); Johannes Wilhelmus Van Tuil, Barcelona (ES)

(73) Assignee: SIG SERVICES AG, Neuhausen am Rheinfall (CH)

(*) Notice: Subject to any disclaimer, the term of this patent is extended or adjusted under 35 U.S.C. 154(b) by 0 days.

This patent is subject to a terminal disclaimer.

(21) Appl. No.: 18/218,553

(22) Filed: Jul. 5, 2023

(65) Prior Publication Data

US 2024/0001624 A1 Jan. 4, 2024

Related U.S. Application Data

(63) Continuation of application No. 17/631,445, filed as application No. PCT/EP2020/071310 on Jul. 28, 2020, now Pat. No. 11,691,349.

(30) Foreign Application Priority Data

Jul. 29, 2019 (NL) ...................................... 2023583
Jul. 29, 2019 (NL) ...................................... 2023584
(Continued)

(51) Int. Cl.
*B29C 65/38* (2006.01)
*B29C 65/00* (2006.01)
(Continued)

(52) U.S. Cl.
CPC .............. *B29C 65/38* (2013.01); *B29C 65/22* (2013.01); *B29C 65/32* (2013.01);
(Continued)

(58) Field of Classification Search
None
See application file for complete search history.

(56) References Cited

U.S. PATENT DOCUMENTS 6,195,967 B1 * 3/2001 Todd ....................... B65B 43/04
53/329.2

FOREIGN PATENT DOCUMENTS

JP H092427 * 1/1997

OTHER PUBLICATIONS

Machine English translation of JPH092427A, Accessed Jul. 11, 2022 (Year: 1997).*

* cited by examiner

*Primary Examiner* — Jacob T Minskey
*Assistant Examiner* — Adrianna N Konves
(74) *Attorney, Agent, or Firm* — The Watson IP Group, PLC; Jovan N. Jovanovic

(57) ABSTRACT

A sealing system for heat sealing superimposed walls of heat-sealable film material, e.g. in the production of pouches. The sealing section comprises two or more sealing stations arranged in series along a linear path for the superimposed walls dispensed from an infeed section. Each sealing station comprises a sealing device with first and second jaws and an actuator device to move the jaws between an opened position and a clamped position. Each sealing device comprises a motion device that is configured to move the first and second jaws in synchronicity with the superimposed walls when clamped between the first and second jaws. Each sealing station has a cooling device that (Continued)

is configured to continuously cool at least one of the jaws. At least each first jaw comprises at the respective front surface thereof at least one impulse heatable member embodied as a susceptor element that extends along the respective front surface. Each sealing station is configured to perform an integrated impulse sealing and cooling cycle.

21 Claims, 21 Drawing Sheets

(30) Foreign Application Priority Data

Jul. 29, 2019 (NL) .................................... 2023585
Oct. 16, 2019 (NL) .................................... 2024025
Nov. 22, 2019 (NL) .................................... 2024295

(51) Int. Cl.
    *B29C 65/22*       (2006.01)
    *B29C 65/32*       (2006.01)
    *B29C 65/78*       (2006.01)
    *B29L 31/00*       (2006.01)

(52) U.S. Cl.
    CPC ...... *B29C 65/7894* (2013.01); *B29C 66/0044* (2013.01); *B29C 66/431* (2013.01); *B29C 66/53262* (2013.01); *B29C 66/72341* (2013.01); *B29C 66/81811* (2013.01); *B29C 66/8511* (2013.01); *B29L 2031/7128* (2013.01)

CONTINUOUS MOTION IMPULSE HEAT SEALING OF FILM MATERIAL

CROSS REFERENCE TO RELATED APPLICATION

This present application is a continuation of U.S. patent application Ser. No. 17/631,445 filed Jan. 28, 2022, entitled "CONTINUOUS MOTION IMPULSE HEAT SEALING OF FILM MATERIAL", which is a 371 national phase of PCT Application Serial No. PCT/EP2020/071310, filed on Jul. 28, 2020, entitled "CONTINUOUS MOTION IMPULSE HEAT SEALING OF FILM MATERIAL", the entire specification of which is hereby incorporated by reference in its entirety.

The present invention relates to the heat sealing of heat-sealable film material. For example, the invention envisages the production of pouches, e.g. pouches having a fitment, having walls of heat-sealable film material.

For example, in the production of pouches superimposed walls of heat-sealable film material are sealed onto one another, and onto a fitment when present, by means of a sealing system that comprises multiple sealing stations in series to create for each pouch multiple sealed regions, e.g. along the top, sides, and/or bottom of the pouch, in succession.

An example of such a sealing system is disclosed in EP 999 130 A1, which discloses a sealing system according to the preamble of claim 1. This known sealing system is adapted to receive two rolls of heat-sealable film material in the roll handling station, where the rolls are unwound, after which the two walls of the heat-sealable film material are brought against each other, so superimposed onto one another. The superimposed walls are moved through the sealing section along a linear path at a constant velocity, e.g. not being pulled intermittently, by the film material drive station. The continuous motion of the walls prevents or at least reduces local stretching of the film material compared to an intermittent, stepwise, movement of the film material through the sealing section. This drive station downstream of the sealing section, for example, has a pair of rollers between which the walls are clamped and an associated drive motor.

In EP 999 130 A1, as is common in the art, the jaws of each of the sealing stations are continuously heated, e.g. electrically, to a temperature that is appropriate for heat sealing. This is known as the hot-bar sealing technique. In operation, the continuously heated jaws are moved into the clamped position wherein the walls of heat-sealable film material are clamped in between them. The clamped jaws than are moved in synchronicity with the superimposed walls for a duration needed to create the heat seal. Then the heated jaws are moved into the opened position and back to a starting position for the next heat sealing cycle. The sealing section of the known sealing system further comprises a downstream cooling station for cooling the seals that have been by means of the sealing stations.

It is a desire to produce pouches of metal-free heat-sealable film materials, preferably single-polymer heat-sealable film materials, also called mono-material plastic films, which enable effective recycling. Such film materials generally only comprise one or more polymeric materials, e.g. just one polymeric material, such as for example one or more layers of one or more of: polyethylene (PE), polypropylene (PP), and polyethylene terephthalate (PET). In embodiments, the film material may have a non-metallic barrier layer, e.g. in view of oxygen transmission, e.g. a barrier layer of ethylene vinyl alcohol (EVOH). Such a layer is often not considered detrimental for recyclability. Due to the absence of a metallic material layer in the film material, these metal-free heat-sealable films are generally weaker, more fragile, than conventional film material that comprises a metal layer. This can in general be described as having a relatively low yield strength and relatively large elasticity, in particular when the film is heated locally during the heat sealing process. In particular at the elevated heat sealing temperatures, the strength of the metal-free film material is, at least temporarily, significantly impaired, giving rise to local distortion when heat sealing is done in the conventional manner.

The known sealing system of EP 999 130 A1 is suited for production of pouches having walls of film material including a metal layer. The known system is considered to be unsatisfactory for the production of pouches having walls made of metal-free heat-sealable film material, e.g. of single-polymer film material. This is primarily due to the above-mentioned effects. The hot-bar sealing stations with the continuously-heated jaws contact the film material walls in the clamped position, so that the seal is made. This contact needs to be terminated as soon as the seal is completed in order to prevent overheating, e.g. local melting, of the walls. However, when the jaws are moved towards their opened position, the walls—then being soft, as they are still warm—become exposed again to the pull force that is exerted by the drive station, without the hot sealed region being supported by the jaws. This causes local stretching and deformation, e.g. noticeable as film layer damage, wrinkles, distortion of print on the film material, etc. For example, this brings along the need to reduce the speed of the sealing system in order to allow for a lower pull force, which is economically unattractive. Also when the continuously heated jaws are in their opened position, located at some distance of the walls, e.g. when they are moved back to a starting position of the cycle, the heat radiated off the jaws tends to unduly soften the film material walls.

The present invention aims to provide an improved sealing system, e.g. to overcome or reduce one or more of the above drawbacks, e.g. in view of production of pouches having walls of metal-free heat-sealable film material, e.g. of single-polymer heat-sealable film material.

The invention provides a sealing system according to claim 1.

In the system, each impulse heatable member is embodied as a susceptor element comprising electrically conductive material. For each of the sealing stations, at least one of the jaws thereof comprises an inductor. The system comprises a high frequency electric current source, which is connected to the inductor. Preferably, the inductor is mounted in the same jaw as the susceptor, e.g. the inductor extending along a rear side of the susceptor element.

Each sealing station is configured so that, in the integrated impulse sealing and cooling cycle, the electric current source temporarily feeds a high frequency electric current to the inductor, thereby generating a high frequency electromagnetic field with the inductor, wherein the high frequency electromagnetic field induces eddy currents in the susceptor element generating an impulse of heat that is emitted by the susceptor element, which impulse of heat seals the region of the superimposed walls onto each other or onto a fitment when present. This arrangement allows for a very effective and controlled generation of a heat impulse that is emitted by the susceptor towards the zone to be heat sealed.

Each of the sealing stations comprises a set of jaws that remain in the clamped positon during the entire integrated impulse sealing and cooling cycle and not only during the actual heat sealing as in EP 999 130 A1. The inventive cycle includes the heat sealing of the region, which heat sealing is immediately followed by the effective cooling of at least one of the jaws, e.g. of both jaws, and thereby also of the sealed region whilst the jaws remain in clamped position after the heat impulse.

The cooling device of each sealing station carries out a continuous cooling of at least one of the first and second jaws, e.g. of both jaws, so even during the heat impulse as the duration thereof is in practice so short that interrupting the cooling during the heat impulse is impractical. The system may, in practical embodiments, be configured and operated to cause cooling of the heat-sealed region before the jaws are opened to below 60° C., e.g. to below 40° C.

Compared to the known sealing system of EP 999 130 A1, the present sealing system thus holds the jaws in the clamped position both during the heat sealing impulse and the subsequent cooling. Hence, the induction-based impulse heat sealing as explained herein, and the cooling takes place using the same set of jaws. In contrast to the known sealing system, there is in practice no need for the provision of a cooling station in the sealing section of the system, for instance for a cooling station where the sealed region is clamped between two cooling members, e.g. cold bars or cold plates, in order to be cooled. The absence, as preferred, of any additional dedicated cooling station in the sealing section of the system, allows to reduce the length of the sealing section. This is beneficial in view of control of the pull force on the superimposed walls as well as for the reduction of the footprint of the system. Also, the fact that in the inventive system cooling starts effectively immediately after cessation of energizing the inductor, avoids undesirable dispersion of heat to locations where heating is not desired and/or where the later removal of the heat is more difficult. For example, in the system of EP 999 130 A1 dispersion of heat away from the sealed region takes place in the time period between the end of the heat sealing at the sealing station and the start of cooling by a downstream dedicated cooling station. For example, when heat sealing a fitment to the walls, e.g. in pouch production, heat will tend to disperse from the actual sealing zone between the film material wall and the fitment to other portions of the fitment, e.g. further away from this sealing zone. The inventive approach effectively counters this effect.

In practical embodiments, the front face of the jaw, e.g. at least the jaw provided with the susceptor element, is covered by a non-stick covering. For example, the covering is Teflon-tape or another tape having non-stick properties, e.g. allowing to replace the covering when becoming worn or soiled during prolonged heat sealing operations. The covering may also be integrated with the susceptor element, e.g. as an integral layer thereon, e.g. a glass layer. As preferred, the non-stick covering on the front of the jaw is the only component separating the susceptor element from the film material to be sealed.

The inventive sealing system allows for the heat sealing of metal-free heat-sealable film material, e.g. of single-polymer heat-sealable film material, onto one another, and onto a fitment when present, e.g. in the production of pouches, e.g. onto a spout of a spouted pouch. For example, the film material is a single-polymer heat-sealable film material made from polyethylene (PE), for example low-density polyethylene (LDPE), or polypropylene (PP), or polyethylene terephthalate (PET) or a multi-polymer heat-sealable film material made from combinations of these polymers. As discussed, preferably, any metal layer is absent in the film material. As discussed, possibly a non-metallic oxygen barrier polymer layer is present in the film material, e.g. of ethylene vinyl alcohol polymer (EVOH). Alternatively, the present system also allows for the heat sealing of film material that comprises a metallic layer, such as an aluminium layer, e.g. an aluminium layer in between layers of polymers, such as polyethylene (PE) and/or polyethylene terephthalate (PET). It is noted that the inventive sealing system also allows for the heat sealing of heat-sealable film having a metal layer.

In the prior art, in order to carry out heat sealing at an economic pace, it was in practice a necessity to have a metal layer in the film material in order to provide sufficient resistance against the combination of thermal and mechanical loads to which the film walls are subjected when passing through the sealing section. As explained herein, the inventive approach avoids such conditions. It allows, for example, to seal metal-free single polymer film materials of limited thickness, e.g. in the production of pouches. Such materials are more convenient to recycle and require less plastic, therefore being more environmentally-friendly and less costly.

An advantage of the inventive sealing system is that the conditions allow for relatively thin walls of film material, e.g. of metal-free film material. The limited thickness of the walls enhances an efficient, e.g. fast, transfer of the heat impulse from the jaw having the susceptor element to the zone where the seal is to be established. For example, in the production of pouches having a fitment sealed between the opposed walls, e.g. a spout, e.g. in an edge region of the pouch, use is made of a fitment sealing station wherein the jaws of each have a susceptor element. The heat impulse is then transferred highly effective from the susceptor element in each jaw to the nearby sealing zone between the film wall and the attachment portion of the fitment. As a consequence thereof, in embodiments, the temperature that is reached in the susceptor element during the heat sealing impulse can be held relatively low, compared to the temperature required in existing hot-bar sealing systems.

The difference between the temperature of the susceptor element when energized by the high frequency field and the heat sealing temperature, that is a melting temperature of the heat-sealable film material and/or of the fitment, may be referred to as a delta-T or delta-temperature. With the sealing system according to the invention, preferably when heat sealing is based on a susceptor in the jaw that is heated by a high frequency field created by an inductor as described herein, the delta-T can in practice be small compared to existing hot-bar sealing systems. Accordingly, the chance of over-heating of the film material directly contacting the front surface of the jaw is reduced, resulting in less or no damage to the film material and an improved seal quality. Furthermore, a low delta-T may allow for the sealing of film materials that could not be heat-sealed effectively in the past, for example allowing a metal-free polypropylene (PP) wall of film material to be sealed to the attachment portion of a polypropylene (PP) fitment, e.g. a spout of a pouch.

Since it is not required to provide one or more dedicated cooling stations along the linear path of the sealing section, e.g. downstream of the sealing stations, the sealing system according to the invention may be significantly smaller in size, e.g. being at least 50% shorter along the linear path, than prior art sealing systems, e.g. in pouch production. Thereby the required space in a factory, e.g. a factory where production of the substance to be filled into the pouches takes place, is reduced, either requiring a smaller factory or enabling more equipment to be installed in the same factory.

For example, the reduced footprint of the inventive sealing system may provide for more convenient integration with a filling device for filling pouches with a substance. Furthermore, the preferred absence of one or more dedicated cooling stations in the sealing section may provide for a less complex, and therefore more reliable, sealing system.

The immediate cooling achieved in the inventive system may in embodiments, e.g. depending on the polymer(s) in the film material and/or fitment when present, provide for improved crystallization in the sealed region, which improved crystallization may result in an improved quality of the heat seal.

Furthermore, in practice, the sealing stations may be configured and operated to provide only a minimal clamping force of the jaws in the clamped position, e.g. less, e.g. far less, than with the traditional continuously-heated sealing jaws wherein the clamping force is a main parameter of the sealing process. For example, the actuator device comprises a stepper motor drive, e.g. with position control, for the jaws. In an embodiment, an elastic member, e.g. one or more springs, are arranged between the stepper motor drive and the jaws so that a position of the stepper motor drive corresponds to a clamping force of the jaws.

The clamping force may effectively be limited to a level such that it only serves to assure an intimate surface contact between the walls in the region to be heat sealed, e.g. to avoid the presence of air between the regions to be sealed. This is in particular advantageous in combination with the induction based heating of a susceptor in at least one of the jaws of a sealing station as described herein. Due to the lower clamping forces that are, preferably, effected in the inventive cycle, any risk of damage to the film material is reduced significantly. This may allow for a reduction of the thickness of the film material, in particular of metal-free film material, resulting in less plastic that is required, e.g. for the production of a pouch.

The motion device of each sealing station may be configured to provide a reciprocating movement, so a back-and-forth movement of the jaws along the linear path. Herein the jaws are stopped at the end of a stroke and moved in the opposite direction. Together with the generally lateral motions for clamping and opening of the jaws, this may result in a so-called box motion path of the jaws. Alternatively, the motion device may provide for a continuous motion of each jaw in one direction along a closed loop, for example an ellipsoid. Generally, the jaws are moved along with the superimposed walls when clamped and then are moved away from the walls followed by a motion back in the opposite direction at a spacing from the superimposed walls to a starting position.

In practical embodiments of the system, even though the heating and the cooling takes place during one stroke of the set of jaws, the length of the stroke along the linear path is relatively small.

In practice, the sealing system can be operated at a high pace, e.g. pouches per minute, e.g. taking into account the velocity at which the superimposed walls are pulled. It is noted, that since each of the sealing stations is controlled independently, is it possible to apply a heat impulse for each seal to be made having a duration that is independent of the overall cycle duration. After the heat impulse has been emitted, the sealed region is immediately cooled for the remainder of the time wherein the jaws are held in the clamped position. In practice, it is not problematic if the jaws are held in the clamped position for even longer than needed to cool to a desired level, e.g. in view of the strength to be regained, as the prolonged clamping may only effect more cooling of the sealed region, which is not harmful, and may even be beneficial for the seal quality.

The jaws of the sealing station are cooled after the heat sealing impulse duration, so that at the moment the jaws are moved into the opened position they are in practice rather cold. This is advantageous in view of the general temperature/thermal situation in the vicinity of the sealing station. For example, there is no undue heating of the film walls due to heat generated by the opened jaws moving back to the starting position of the motion. Such a negative impact of heat generated by opened jaws is witnessed in hot-bar sealing system of EP 999 130 A1. Avoiding this undue heat also is advantageous in embodiments wherein the sealing section is embodied such that the sealing stations are accommodate in an aseptic chamber.

Due to the jaws being rather cold in their opened position, in an embodiment wherein the jaws remain facing towards the superimposed walls during their motion back to a starting position along the linear path, an undue heating of the superimposed walls is avoided. For example, the jaws pass along an upper or lower edge of vertically oriented superimposed walls passing through the sealing section back to the starting position where the jaws are clamped onto the walls. This edge zone may then become unduly heated in case of hot-bar sealing and, under influence of the pull force, stretch undesirably. Also, due to the jaws being rather cold in their opened position, the jaws need not be spaced far from the walls in order to perform the return motion, thus limiting the magnitude of the spacing between the jaws in opened position, which facilitates high speed operations. In case of a stoppage of the sealing system, the fact that the jaws are rather cold when opened avoids undue local heating of the very portion of the walls located at the sealing station when the system stopped, e.g. due to a fault. This may enhance overall efficiency of the sealing system compared to hot-bar sealing systems.

In general, the inventive sealing system allows for operations at high production rates, so with a high velocity at which the walls of heat-sealable film material are pulled along the series of sealing stations, resulting in an improved productivity. Compared to known sealing systems, e.g. with continuously-heated jaws and dedicated cooling stations, the production rate may be up to three times higher. This applies in particular in combination with the induction based heating of a susceptor in at one of the jaws of a sealing station as described herein. Additionally, the sealing system may operate at a lower energy consumption, since the jaws not need to be heated continuously, but only for a short period of time during the heat impulse.

The control unit of the sealing system is, for each one of the sealing stations independently, configured to control the heat impulse emitted by the at least one susceptor element thereof, e.g. to control the heat impulse intensity and/or duration, and is, for each of the sealing stations independently, configured to control the actuator device for moving the first and second jaws relative to one another between the opened position and the clamped position allowing to control the duration of the clamped position of the first and second jaws and thereby the clamped cooling duration. As explained herein, cooling of at least one of the jaws of each sealing station, preferably of both jaws, is continuous so that cooling of the sealed region takes place as long as the jaws are clamped onto the sealed region after the heat impulse has taken place.

In an embodiment, both of walls to be joined are made from heat-sealable film material, preferably metal-free heat-sealable film material, e.g. in the production of collapsible pouches or in the production of packaging materials with air-filled pockets.

The sealing station can be embodied to heat seal a pouch walls, e.g. to heat seal walls of a Bag-in-Box pouch, for example of the type disclosed in WO 2015/189036 A1.

The sealing station can further be embodied to heat seal a spout to a pouch wall, for example to heat seal an annular attachment flange of a spout, e.g. a Bag-in-Box spout, of the type disclosed in WO 2015/189036 A1.

In a preferred embodiment, the control unit in conjunction with the one or more cooling devices is configured to control the cooling rate of at least one of the first and second jaws as well as of the region that is sealed by the sealing station, for each one of the sealing stations independently. For example, the flow rate and/or temperature of liquid coolant, e.g. water, that cools one or both jaws of one sealing station can be adjusted independently from the flow rate and/or temperature of liquid coolant, e.g. water, which cools one or both jaws of another sealing station. For example, in practical embodiments, liquid coolant, e.g. water, is fed to the sealing station jaw(s) at a temperature of between 10 and 25° C. to cool the jaw(s). For example, the lower limit of the temperature of liquid coolant fed to the jaw(s) is chosen so as to avoid condensation, e.g. on flexible coolant lines connected to the jaw(s).

The ability, as preferred, to control for each sealing station independently from other sealing stations, both the impulse heating and the cooling, enhances versatility of the sealing system, for example allowing for handling of a wide variety of film materials, e.g. metal-free film materials. It also allows for the sealed region to be subject to an accurate temperature profile over time during the inventive cycle, which enhances the formation of a reliable and reproducible heat seal that is made with each of the sealing stations.

Control of the impulse heating and the subsequent cooling is, preferably, achieved by a configuration of the system that allows for independent control of parameters associated with the operation of each sealing station independently. Examples of such parameters are, for control of the heating sealing effected by the at least one susceptor element of a sealing station, the heat impulse intensity, the heat impulse duration, the amount of heat comprised in an emitted heat impulse (e.g. based on control of the amount of energy supplied to the inductor), and, for control of the cooling, the duration of the effective cooling between the clamped jaws, the cooling rate, etc. Other parameters may involve, for example, the clamping force, and/or the overall clamping duration, and/or the speed of the return movement of the jaws.

In embodiments, the motion devices are configured to allow for full individual control of the motion of jaws along the linear path, so along with the walls for sealing and back to a starting position when in opened position.

In pouch production, the ability for individual control of the heat sealing and cooling processes as discussed herein, contributes to the flexibility of the sealing system and enables many different types of pouches, all with different parameters for the impulse heating, the cooling, the actuator device, and/or the motion device, to be sealed with the same sealing system, e.g. without requiring complex mechanical modifications of the sealing system when making a switch from one pouch to another. This allows for reducing of switching times in between the making of different types of products, e.g. pouches, and therefore improves the productivity even more.

Furthermore, when starting up the innovative sealing system or when switching from one product to be produced with the system to another product to be produced, the susceptor elements may reach constant operating conditions, e.g. a stabile thermal behaviour of the jaws, faster than prior art sealing system having continuously-heated jaws. This allows for enhanced overall efficiency, e.g. less waste products being produced, and/or for reduction of the time needed for such a switch. In known sealing stations with continuously heated jaws, the start-up may require up to 30 minutes before truly stabile conditions are reached. Instead, in the inventive approach the jaws of the sealing station may take less time to reach a steady state, typically only in between 1 and 2 minutes.

In embodiments, one or both jaws have a main body, e.g. of plastic or ceramic material, e.g. a heat-resistant material, e.g. of PEEK, on which the susceptor element and/or the inductor are mounted. For example, the susceptor is mounted on a face of the main body. E.g. the inductor is embedded in the main body, e.g. housed in a bore through the main body. The plastic or ceramic material of the main body of the jaw is selected to not impair the high frequency field that is generated by the inductor, at least not in an undesirable manner. Boron nitride, and/or Aluminium nitride, and/or Polyphenylene sulphide, and/or vulcanized silicone materials can be considered as well for the main body. In particular, Boron nitride provides for a good thermal conductivity, thereby enabling a good conductivity of heat from the susceptor element and the inductor towards the cooling device, e.g. towards the cooling fluid, e.g. water, circulated through duct(s) in the main body.

In an embodiment, the susceptor element is made of metal material, e.g. a metal or a metal alloy, e.g. as a thin metal strip. In an embodiment, the susceptor element, e.g. embodied as a strip, has a thickness of between 0.01 and 5 mm, preferably between 0.05 and 2 mm, more preferably between 0.08 and 0.8 mm, e.g. of between 0.3 and 0.5 mm. In general, it is considered desirable to have a minimum thickness of the susceptor element in view of the desire to rapid cool the jaw, e.g. including the inductor and the susceptor, after termination of the heat impulse. A thin design of the susceptor contributes to this desire. It is noted that no electric current from a current source is passed through the susceptor, so the cross-section need not be designed to deal with such a current flow.

In embodiment, the thickness of the susceptor element may differ locally from a nominal thickness. For example, the susceptor element may comprise a thickened portion at its rear surface, e.g. facing away from the front surface of the jaw, to locally increase the intensity of the electromagnetic field in the susceptor element, in order to locally increase the intensity of the heat impulse that is emitted by the susceptor element.

For example, the susceptor element is made of, or comprises, aluminium, nickel, silver, stainless steel, molybdenum and/or nickel-chrome.

In an embodiment, the susceptor element is embodied as a strip having opposed front and rear main faces that define the thickness of the strip between them.

In an embodiment, the thickness of the susceptor element is constant over the extension of the element.

In an embodiment, the susceptor element is embodied as a planar strip. Herein, preferably, the plane of the strip is parallel to the front of the jaw.

The front of the jaw equipped with the susceptor element, possibly both jaws being equipped with a susceptor element and an associated inductor, is preferably smooth, so devoid of any relief that locally holds the wall of film material away from the jaw and creates air pockets between the jaw and the wall of film material. This smooth design causes a very effective transfer of the heat impulse from the jaw to the zone where the joint is made. In practice it can be observed that a heat seal joint is achieved through the entirety of the area where the susceptor emits heat towards the walls of film material.

In an embodiment, each of the jaws of a sealing station comprises a susceptor element of electrically conductive material as well as an associated inductor, wherein, preferably, the sealing station has multiple electric current sources each connected to a respective inductor of a respective jaw. Preferably, the control unit is configured to independently control each of the electric current sources of the sealing station in order to individually control the current that is fed to each of the inductors, so as to allow for control of the heat impulse emitted by each jaw of one sealing station individually. This, for example, allows to vary the timing of the heat impulse emitted by the first jaw relative to the heat impulse emitted by the second jaw, e.g. the one being time after the other or in some form of timed overlap, e.g. in view of heat input into the seal region.

In an embodiment, the susceptor element extends along the front surface of the respective jaw and has a rear side, e.g. the susceptor element being embodied as an elongated strip or having one or more elongated strip shaped portions, wherein each inductor comprises an elongated inductor section that extends along the rear side of the respective susceptor element, e.g. parallel to the susceptor element.

Due to the extension of the at least one elongated inductor section along the front surface of the jaw, e.g. a rectilinear inductor section, and also along, generally parallel, to the susceptor element, e.g. in an embodiment at the rear side of the at least one susceptor element, preferably in close proximity to said rear side, the development of heat over the extension of the front of the jaw takes place in an attractive manner, in particular in a rather uniform manner. The elongation of the inductor section, e.g. embodied as a strip, contributes to the homogeneity of the current density within the inductor section, e.g. compared to a coiled or another rather irregular shape of an inductor section. This homogeneity translates into homogeneity of the high frequency field, and thereby to homogeneity of the impulse heating of the susceptor element. The latter contributes to a reliable and effective heat sealing in the seam regions of the walls of film material.

The homogeneity of the heat sealing and the impulse process allow to have a minimal clamping force of the jaws in the clamped position, e.g. far less than with the traditional continuous heated sealing jaws. The clamping force may effectively only serve to assure an intimate surface contact between the walls or between the walls and the attachment portion of a fitment when present, e.g. in a spouted pouch.

In embodiments, the inductor is a solid cross-section metal or other, preferably high conductivity material inductor, e.g. made of copper which is preferred. This arrangement allows to avoid undue variations of current density within the inductor, and thereby undesirable variation in the generated field, e.g. compared to an internally hollow inductor. In alternative, less preferred, embodiment, the inductor is a multi-strand Litz wire. It has been observed that in such embodiment, heating of the Litz-wire may become problematic and cooling is more difficult.

In an embodiment, the inductor of a jaw comprises multiple elongated inductor sections that are parallel to one another, e.g. rectilinear elongated inductor sections. In embodiments, the sections are arranged side by side in a plane parallel to the front face of the jaw. The adjacent inductor sections are spaced from one another by a slit, e.g. an air slit or a slit filled with electrically insulating material. In embodiments, the inductor of a jaw comprises multiple, e.g. just one pair of, elongated inductor sections that are parallel to one another and spaced from one another by a slit. Herein the susceptor element, seen in a view onto the front surface of the jaw, extends over the slit(s), e.g. over the one slit between a pair of inductor sections. The presence of the slit between the parallel inductor sections, e.g. rectilinear elongated inductor sections, allows for a desirable concentration of the field that is generated by the inductor of the jaw on the susceptor. In an embodiment, the susceptor element extends, seen in a view onto the front surface of the jaw, over a slit between parallel inductor sections.

In embodiments, the slit between neighbouring inductor sections, e.g. rectilinear elongated inductor sections, has a width between 0.01 and 5 mm, more preferably between 0.1 and 2 mm.

In an embodiment, the at least one elongated inductor section, e.g. rectilinear elongated inductor section, has a thickness of between 1.0 and 4.0 mm, seen perpendicular to the front surface of the jaw, for example between 1.5 and 3.0 mm. The limited thickness of the inductor element enhances the cooling of the jaw, including the conductor of the jaw, e.g. as one or more cooling fluid ducts are preferably arranged in proximity of a rear side of the at least one inductor element.

Energizing an inductor for effecting heat sealing may consist of a single, short period of high frequency electric current being passed through the inductor. It may also be done as a succession of even shorter periods, e.g. with different intensities of the electric current being passed through the inductor during various periods for effecting a single heat sealing.

In embodiments, the frequency of the electric current supplied to the inductor is between 100 kHz and 1 MHz, for example between 250 kHz and 750 kHz.

In embodiments, the magnitude of the electric current supplied to the inductor is between 20 A and 600 A.

In embodiments, the electric current is supplied to the inductor at a voltage with a magnitude between 40 V and 500 V.

In an embodiment, the heat impulse duration lies between 10 and 1000 milliseconds, e.g. between 20 and 500 milliseconds, e.g. between 75 and 400 milliseconds.

In an embodiment, the clamped cooling duration or effective cooling phase which directly follows the heat impulse may have a duration between 200 and 800 milliseconds, e.g. between 300 and 600 milliseconds.

Preferably, the inductor is mounted in the same jaw as the susceptor, e.g. the inductor extending along a rear side of the susceptor element. In another embodiment the first jaw is provided with the susceptor element and the second jaw is devoid of a susceptor element, wherein the second jaw is provided with the inductor and the first jaw is devoid of an inductor. In this arrangement the inductor in the second jaw generates a high frequency electromagnetic field that induces eddy currents in the susceptor element of the first jaw, thereby generating an impulse of heat that is emitted by the susceptor element of the first jaw. An advantage of this design is that the susceptor element can be cooled highly effective, e.g. by arranging at least one cooling fluid duct in proximity to the susceptor element, e.g. the cooling fluid duct extends along the rear side of the susceptor element, e.g. parallel to the susceptor element. In this design the second jaw can also be cooled by the cooling device, e.g. by arranging at least one cooling fluid duct in proximity to the inductor, e.g. the cooling fluid duct extends along the elongated inductor section, e.g. along the rear side thereof. A drawback of the alternative arrangement is that the spacing between the susceptor element and the inductor is dependent on factors that may be somewhat variable in practical operation like the thickness of the walls, e.g. dependent on the film material that is handled, the clamping force, etc., which may be detrimental to the accuracy and repeatability of the sealing process. Therefore, in practice, preference is given to an arrangement of the susceptor and associated inductor within one and the same jaw.

The non-stick covering on the at least one susceptor element may be replaceable, so that it is only required to replace the non-stick covering when it has worn out or has become soiled, whereas in prior art sealing systems, the entire jaw had to be replaced.

In an embodiment of the sealing system, for each of the sealing stations, the at least one of the first and second jaws that is cooled by the cooling device comprises one or more cooling ducts and the cooling device establishes a continuous circulation of liquid coolant, e.g. water, through the one or more cooling ducts. Preferably, the duct is formed as a bore in the plastic or ceramic main body of the jaw so as to obtain direct contact between the liquid coolant and the main body. This embodiment also avoids undue disturbance of the field by any other material that would form the duct for the liquid coolant.

In an embodiment, the control unit is configured to adjust the temperature and/or flow rate of coolant circulated along the jaws, e.g. on the basis of the output of a temperature sensor. By controlling the coolant temperature and/or the flow rate, the control unit may control the cooling power to achieve a temperature decrease in the sealed region that optimally suits the seal to be made.

In an embodiment, each cooling device comprises a coolant temperature sensor to sense and output the actual temperature of the coolant and/or a coolant flow sensor to sense and output a flow rate of the coolant circulated along the one or more jaws, e.g. for each jaw individually, and the control unit is configured to adjust the temperature and/or flow rate of coolant circulated along the jaws, e.g. for each jaw individually, on the basis of the output of the coolant temperature sensor and/or the coolant flow sensor. The coolant temperature sensor(s) may be configured to continuously measure the temperature of the coolant, e.g. a temperature of the coolant returning from the jaws or a temperature in coolant reservoir, or may be configured to only output peak temperature values of the coolant, e.g. representing a peak value of the coolant temperature for each of the impulse sealing cycles. The control unit may determine, when it is found that the temperature of the coolant is above a desired temperature level, to lower the temperature of the coolant that is pumped towards that respective jaw and/or to increase the flow rate of the coolant towards that respective jaw.

In an embodiment, each cooling device comprises a stationary mounted pumping and heat exchanger assembly, which is connected to the one or more movable jaws of the sealing stations via one or more flexible coolant hoses. In an embodiment, there is a dedicated stationary mounted pumping and heat exchanger assembly for each sealing station, possibly for each jaw. This, for example, allows to enhance the independent control of the cooling, for example, enabling operation with individual settings of coolant temperature and flow rate for each sealing station or for each jaw.

In an embodiment, at least one sealing station, preferably each sealing station, comprises a temperature sensor associated with, e.g. arranged in, the first jaw and/or second jaw, which sensor linked to the control unit and is configured to sense and output the actual temperature of the respective jaw, e.g. of a front surface of the jaw and/or of a susceptor element of the jaw when present. The control unit is configured to control the heat sealing and/or the cooling effected by the sealing station at least in part on the basis of the output of this temperature sensor. The temperature sensor may be configured to continuously measure the temperature of the respective jaw, e.g. of the susceptor element thereof, or to only output a peak temperature value, e.g. representing a peak value of the jaw temperature for each of the cycle, or may be configured to determine an average temperature of the jaw e.g. of the susceptor elements thereof, during the cycle.

In an embodiment, the control unit is configured to adjust the high frequency current that is fed to an inductor associated with a susceptor in a jaw of a sealing station on the basis of the output of a temperature sensor associated with the jaw. By controlling the high frequency electric current, for example the magnitude of the current, the duration of the current, the distribution of the magnitude of the current within a heat sealing impulse (e.g. the inductor energized in a succession of periods of different currents), and/or the frequency of the current, the control unit controls the electromagnetic field generated by the respective inductor, thereby controls the eddy currents induced in the susceptor element and thereby the heat impulse that is emitted from the susceptor element.

In an embodiment, each jaw having an inductor, and preferably also a susceptor element, has the inductor connected to a dedicated electric current source, wherein the control unit is configured to independently control each of the electric current sources in order to individually control the individual high frequency current fed to the respective inductor. This further facilitates individual control of the electromagnetic field generated by each inductor.

In an embodiment, the system is configured and operated to effect a preheating phase in the cycle discussed herein, wherein a preheating is effected prior to the effecting the actual heat sealing impulse. In practice the preheating phase is effected just prior to effecting the heat sealing impulse.

In an embodiment, the control unit is configured to cause a preheating before or during the time that the jaws are moved in the clamped position. Herein the susceptor element and/or the front surface of the jaw may reach a preheating temperature before the jaw contacts the wall of heat-sealable film material. In an alternative embodiment, the control unit is configured to cause a preheating whilst the jaws are in the clamped position, e.g. have just reached the clamped position.

The preheating phase, preferably, comprises the generating of a preheating heat impulse with the susceptor element(s) by feeding a preheating high frequency electric current to the inductor to generate a preheating electromagnetic field with the inductor that causes a preheating by means of the susceptor element. The preheating is done, preferably, to a preheating temperature that is avoids any melting of the film material. The subsequent heat sealing impulse emitted by the susceptor of the jaw then causes the desired melting for the heat sealing.

As preferred, when sealing a fitment with the inventive system, e.g. in pouch production, there is no preheating of the fitment, e.g. of the attachment portion, prior to inventive cycle being effected at a fitment sealing station. This avoids undue dispersion of heat inputted by such preheating in the fitment, which is beneficial for reasons described herein.

In an embodiment, as known in the art, the infeed section comprises a folding station that is configured to fold film material dispensed from a single roll into two superimposed walls, optionally with a gusset, e.g. the gusset forming a bottom gusset of a pouch to be produced with the sealing system.

In an embodiment, the control unit is, for each motion device of the sealing stations independently, configured to control at least the stroke length over which the jaws are moved along the linear path. This, for example, allows to have a stroke length that corresponds to the travel of the jaws in clamped position. This, for example, allows to avoid that in case just a short stroke length when clamped is needed, the jaws are moved over a greater stroke length. In particular at high speed operations, e.g. in pouch production, limiting the actual stroke length is beneficial, e.g. in view of mechanical forces due to accelerations/decelerations, wear of the motion device, etc. This embodiment, for example, enables different stroke lengths of the jaws of different sealing stations in the sealing section.

In an embodiment, the control unit is configured to control the motion device of the first sealing station and the motion device of the second sealing station so as to adjust the position of the first and second jaws of the first sealing station with respect to the position of the first and second jaws of the second sealing station, e.g. in order to adjust a mutual distance between them along the linear path. This is, for example, desirable in view of production of differently sized pouches.

In an embodiment, the sealing system comprises a stationary frame, wherein the motion devices of successive sealing stations are mounted at opposite sides of the linear path for the superimposed walls through the sealing section, e.g. the superimposed walls being in vertical orientation when moving along the sealing section and the motion devices of successive sealing stations being mounted alternating below and above the linear path. For example, a fitment sealing station has its motion device below the path with the fitment being inserted via a fitment inserting device arranged above the path, e.g. introducing the fitment in between a non-bonded edge region of the superimposed walls.

For example, each motion device comprising a linear guide assembly with a linear guide mounted to a stationary frame and extending parallel to the linear path. Herein a slider is mounted on the linear guide, which slider is driven by a reciprocating drive. The slider supports the jaws of the sealing station as well as the associated actuator device.

In an embodiment, at least one sealing station, preferably each sealing station, comprises a position sensor in its first jaw and/or second jaw that is linked to the control unit and is configured to sense and output the position of the respective jaw, e.g. in direction of the linear path and/or transvers to the linear path. The position sensor may sense the position relative to a fixed reference, e.g. on a stationary frame, and/or with respect to the walls of heat-sealable film material. In an embodiment, the control unit is configured to control the motion device of a sealing station on the basis of the output of the position sensor. The position sensor may be configured and operated to continuously measure the position of the respective jaw(s), or may be configured to only measure a certain position of the jaw(s), for example a starting position at the start of each cycle or an end position where the jaws are brought into the open position, e.g. at the end of the cooling phase.

In an embodiment, the position sensor is an optical sensor, which is configured to image the film-material and to detect markings that have been provided on the film material. Such a marking, for example a printed marking, may indicate a relevant position in the film material, for example indicating a position where, at a later stage, a cut is to be made to individualize the pouches, or may represent an alignment between the superimposed walls of film material. The optical sensor may be connected to the control unit and the control unit may be configured to control the motion device on the basis of the output of the optical sensor, e.g. on the basis of the detecting of the marking.

In an embodiment, the control unit is configured to operate on the basis of a feedback-type control mechanism, wherein one more measurements of parameters made during a first cycle form at least in part basis for controlling the impulse heating and/or the cooling and/or the moving of the jaws for one or more subsequent cycles.

In an embodiment, the control unit is configured with a memory and is operated to log, e.g. during the production of pouches, one or more parameters, for example one or more settings and/or actually measured parameters related to the impulse heat sealing and/or the cooling and/or the moving of the jaws of the sealing stations. By logging parameters, one may be able to retrieve afterwards which seal, e.g. of which pouch, has been made at which specific setting(s). This may contribute to the monitoring of the quality of the seals that are being made.

In an embodiment, the control unit is provided with a memory in which, for multiple different seal configurations, e.g. for production of multiple pouch designs, a respective data set is stored, e.g. for each sealing station. A data set may comprise, for example, settings related to the impulse heating of the susceptor elements, e.g. of the electric current source(s) and/or related to the operation of the cooling device, actuator device, and/or motion device. The stored parameters, for example, comprise one or more of the duration of the clamping by the jaws, the duration of heat sealing impulse for each susceptor element, the duration of the cooling, the coolant temperature, the cooling flow rate, The data set may, in embodiments, comprise the clamping force, and/or parameters related to the operation of the motion device, e.g. starting position, end of stroke position, velocities, etc.

In an embodiment, the sealing system comprises an operator input device, e.g. a touchscreen, e.g. allowing a machine operator to select a seal configuration, e.g. on the basis of selecting a pouch design, wherein the control unit is configured to select the appropriate data set stored in the memory accordingly. This contributes to the flexibility of the sealing system and enables convenient switching between parameter settings for many different types of pouches, e.g. with different parameter settings for the impulse heating, the cooling, the actuator device, and/or the motion device, to be sealed with the sealing system, preferably without requiring complex mechanical modifications of the sealing system. In embodiments, it may not even be required to interchange all of the jaws when switching between different pouch designs.

In an embodiment, the sealing system further comprises a display, e.g. a touchscreen, configured to display thereon the selected data set in graphical form, e.g. as a graph or graphs representing dimensions, e.g. of the selected pouch, heat sealing and cooling related parameters, etc. This display enables the operator to review the respective parameters and may enable for convenient verification whether the sealing system has been set up correctly, e.g. for the correct seal configuration.

In an embodiment, the actuator devices and/or the motion devices each comprise a servomotor. Servomotors can be controlled accurately by means of the control unit, which may provide that the jaws can be moved accurately at high velocities to obtain high quality seals.

In an embodiment, the sealing section is provided with a trimming station, e.g. downstream of the sealing stations, wherein the trimming station comprises:
- a trimming device configured to perform on command a trimming action, e.g. punching, notching, etc., in order to remove a portion of the superimposed webs, e.g. in order to shape a contour of a pouch in the production of pouches,
- a motion device that is configured to move trimming device in synchronicity with the superimposed walls when performing the trimming action,
- a collection system configured to collect the trimmed portions, e.g. comprising one or more vacuum hoses connected to a vacuum source.

The invention also relates to a production machine for the production of collapsible pouches, the pouches each having walls made from heat-sealable film material, preferably metal-free heat-sealable film material, most preferably single-polymer heat-sealable film material. The production machine comprises the sealing system as described herein.

In an embodiment, the machine is configured for the production of pouches having a fitment, e.g. a spout. In an embodiment, the first sealing station along the linear path, so the one at the entry side of the sealing section, is configured as a fitment sealing station that is adapted to heat seal a fitment onto the superimposed walls, e.g. between a non-bonded edge region of the walls. Herein one or more downstream sealing stations are configured to seal one or more other regions of the pouch, e.g. to provide a side seal and/or a bottom seal of the pouch, whilst still part of a continuous string as individualizing of the pouches is effected downstream of the sealing section.

An advantage of first heat sealing the fitment in a non-bonded edge region between the opposed walls, prior to the sealing of one or more other regions to be heat sealed of the pouch, is that the superimposed film material walls are easily separated for introduction of the attachment portion of the fitment in this open edge region. Separation of this edge region is, for example, done by a wedge member that is stationary arranged and that separates the walls in the edge region ahead of reaching the position for the fitment insertion. This is easier to carry out, in particular at high speeds made possible by the inventive system, than the prior art approach wherein commonly first one or more other heat seals, e.g. side seals, are made connecting the pouch walls to one another prior to heat sealing the fitment in a non-bonded edge region. This prior art approach requires the provision of an actuated opening device for deflecting the walls away from each other and to enable insertion of the fitment. In practice, this requires intermittent motion of the walls through the sealing section or a motion at undesirable low speed to effect the deflecting of the walls away from each other.

In an embodiment, the machine comprises a fitment inserting device that is adapted to insert an attachment portion of a fitment, e.g. of a spout, in a non-bonded edge region between the opposed walls, e.g. this region being opposite from a fold connecting the opposed walls, e.g. a fold provided with a gusset, e.g. to form bottom gusset of the pouch. The fitment sealing station is configured to heat seal the walls to opposed sides of the attachment portion of the fitment.

In an embodiment, the fitment inserting device is configured to substantially simultaneously insert two attachment portions of two fitments in the non-bonded edge region of at least two adjacent pouches in one cycle by one set of first and second fitment inserters. Consequently, the fitment sealing station is configured to heat the walls of the two adjacent pouches to opposed sides of both attachment portions of both fitments in one cycle by one set of first and second jaws.

In an embodiment, the fitment sealing station is configured to heat seal a plastic fitment having an attachment portion in a non-bonded edge region between the opposed first and second walls made from heat-sealable film material,
- wherein the front surfaces of the first and second jaws of the fitment sealing station each have a recessed face portion defining a recess configured to receive therein a half of the attachment portion of the fitment, and wherein the front surfaces each define, on opposite sides of the respective recessed face and adjoining said recessed face, coplanar face portions,
- wherein each of the first and second jaws of the fitment sealing station comprises at the respective front surface thereof at least one, e.g. a single elongated, susceptor element that extends along the recessed face portion and along the coplanar face portions of the respective front surface,
- wherein the fitment sealing station is configured such that, in operation, the fitment is positioned with the attachment portion thereof in the non-bonded edge region, between the opposed first and second walls made from heat-sealable film material, and
- wherein the fitment sealing station is configured to perform the inventive cycle as described herein.

In an embodiment, the fitment sealing station is configured such that, in operation, the superimposed walls and the attachment portion of the fitment are positioned in between its first and second jaws and such that the one or more susceptor elements project over the non-bonded edge regions of two adjacent pouches, wherein the fitment sealing station is configured to perform the inventive cycle as described herein.

The fitment can, for example, be a spout for discharge of product from a pouch, e.g. a flowable product, e.g. a liquid product, e.g. a flowable food product, e.g. a beverage, sauce, etc. The fitment may have a neck that is closed or that is configured to be closed by a closure member, e.g. a cap, e.g. a screw cap, snap cap, flip-top cap, etc. The fitment may comprise a valve, e.g. a bidon-type valve, a self-closing valve, e.g. a slit valve, etc.

Each impulse heatable member of the fitment sealing station is a susceptor element comprising electrically conductive material, said susceptor element having a rear side facing away from the respective front surface of the jaw,
- wherein each of the first and second jaws of the fitment sealing station comprises an inductor which is electrically insulated from the respective susceptor element, wherein each inductor extends along the respective front surface at the rear side of the respective susceptor element,
- wherein a high frequency electric current source is connected to the inductor of each of the first and second jaws of the fitment sealing station, and wherein the fitment sealing station is configured to perform the inventive cycle as described herein.

In an embodiment, the jaws of the fitment sealing station are configured, e.g. have a susceptor element, so that the entire non-bonded edge region in which the fitment is inserted, e.g. by a fitment inserter device of the sealing system, is sealed in one inventive cycle as described herein. So both the fitment is secured in the edge region and the entirety of the related edge region is heat sealed and closed. This avoids the need for additional sealing actions along this edge region.

In an alternative embodiment, the jaws of the fitment sealing station are configured, so that only the part of the non-bonded edge region where the fitment is located is sealed in the cycle, with another part of the non-bonded edge region remaining open. This, for example, allows for a later filling of the pouch via said open part. This open part is then later closed in another sealing step, e.g. based on impulse heat sealing as disclosed herein.

In an embodiment, the sealing system of the pouch production machine comprises a side seam sealing station that is configured to heat seal two adjacent side regions of adjacent pouches in a string of still interconnected pouches. In embodiments, the side seam sealing station is, when seen along the linear path, downstream of the fitment sealing station, e.g. located in between the fitment sealing station and a bottom region sealing station when present.

In an embodiment, the side seam sealing station is configured to heat seal both side regions of a pouch, e.g. and both respective side regions of adjacent pouches, in one cycle by one set of first and second jaws. In an embodiment, the side seam sealing station is configured such that, in operation, the superimposed walls are positioned in between its first and second jaws and such that the one or more susceptor elements project over the both side regions of at pouches and over both respective side regions of adjacent pouches, wherein the side seam sealing station is configured to perform the inventive cycle as described herein.

In an embodiment, the pouch production machine comprises a bottom region sealing station which is configured to heat seal a bottom region of the pouch.

During the sealing of collapsible pouches without a bottom gusset, the pouch walls, e.g. connected via a fold, are clamped against each other directly in the bottom region by the jaws of a bottom sealing station. Herein, it may suffice to have one of the first and the second jaw provided with a susceptor element and an inductor and the other jaw merely being embodied and operated as a passive counter jaw, e.g. the passive jaw being cooled.

In an embodiment, the bottom region sealing station is configured to heat seal bottom regions of at least two adjacent pouches in one cycle by one set of first and second jaws. In an embodiment, the bottom region sealing station is configured such that, in operation, the superimposed walls are positioned in between its first and second jaws and such that the one or more susceptor elements project over the bottom regions of two adjacent pouches, at least over a part of each of the two bottom regions, wherein the bottom region sealing station is configured to perform the inventive cycle as described herein.

Each impulse heatable member of the bottom region sealing station is a susceptor element comprising electrically conductive material, the susceptor element having a rear side facing away from the respective front surface of the jaw, wherein each susceptor element of the bottom region sealing station has a front surface that is shaped as an inverted T, such that the heat impulse seals at least a portion of side edge regions of the two adjacent pouches and also seals at least a portion of bottom edge regions of each of the two adjacent pouches, wherein at least one, preferably each, of the first and second jaws of the bottom region sealing station comprises an inductor which is electrically insulated from the respective susceptor element, wherein each inductor comprises an elongated inductor section that extends along the rear side of an elongated portion of the inverted T shaped susceptor element, wherein a high frequency electric current source is connected to the inductor, and wherein the bottom region sealing station is configured to perform the inventive cycle as described herein.

In an embodiment, the inductor of a bottom region sealing station has the shape of an inverted T and comprises first, second and third inductor parts, each inductor part comprising multiple elongated inductor sections parallel to one another, e.g. separated from another by a slit, the multiple elongated inductor sections of an inductor part being interconnected in series, e.g. by a bent portion of the inductor at an outer end of the inductor part of the T. The three elongated susceptor parts of the inverted T-shaped susceptor elements may be interconnected at a central portion of the susceptor element. In operation, a first one of the elongate susceptor parts may project towards a top end of the pouches and may project over the side edges of the two adjacent pouches, e.g. at least over a lower portion of said side edges. In operation, this upward elongate susceptor part may thereby at least partially seal the side edges of the adjacent pouches.

In an embodiment of the pouch production machine for production of bottom gusset type pouches both the first and the second jaw of the bottom sealing station are each provided with a susceptor element and an inductor in order to seal the first gusset portion against the first wall and to seal the second gusset portion against the second wall.

In the production of collapsible pouches having a bottom gusset, the superimposed walls are fed to the bottom sealing station in a folded configuration defined by the first wall, a first bottom gusset portion, a second bottom gusset portion, and the second wall, generally in a W-shape as is known in the art. Also, as known in the art, a so-called triple point is then present at each of the side edges of the gusset bottom pouch, wherein above the triple point the first and second wall are in direct contact with another and wherein below the triple point the two gusset portions are located in between the first and second wall. Therefore, at the triple point, the thickness changes between two times the wall thickness and four times the wall thickness. Near this transition heat sealing is notoriously difficult by existing sealing techniques. The inverted T design may be applied for sealing of the bottom gusset including the triple point.

In the production of bottom gusset type pouches, the accurate control of the heating provides that, in the part of the pouch at and below the triple point, sufficient heat is provided to seal each gusset portion to the respective first or second wall, and that the amount of heat will not be too large, in order to prevent that the gusset portions are welded to each other.

The homogeneity of the heat sealing impulse process allow to have a minimal clamping force of the jaws in the clamped position, e.g. far less than with the traditional continuous heated jaws. The clamping force may effectively only serve to assure an intimate surface contact between the pouch walls and the inward located gusset portions when present.

For the sealing of bottom regions of pouches with a bottom gusset, the clamping force may be selected larger than the clamping force for welding bottom regions without a bottom gusset, e.g. in view of reliably expelling air from clamped parts of the pouch, e.g. at the triple point.

In an embodiment, the pouch production machine is embodied such that the linear path of the walls through the sealing section is horizontal, wherein the infeed section is configured to fold film material dispensed from a single roll into two superimposed walls, wherein the superimposed walls are in vertical orientation when supplied to the sealing section with a non-bonded top edge region between the opposed walls and a fold along a bottom of the opposed walls, optionally with a bottom gusset folded along the bottom of the opposed walls, wherein a fitment inserting device is provided which is adapted to insert an attachment portion of a fitment in the non-bonded top edge region between the opposed walls, e.g. the fitment inserting device being stationary mounted on a stationary frame of the machine, and wherein the motion device of the associated fitment sealing station is mounted below the linear path, e.g. said motion device comprising a linear guide assembly with a linear guide mounted to on a stationary frame parallel to the linear path and a slider mounted on the linear guide driven by a reciprocating drive, the slider supporting the jaws of the sealing station as well as the associated actuator device.

In embodiments, the machine comprises a cutting station that is arranged downstream of the film material drive station and is configured to make one or more cuts in order to create individual pouches.

In embodiments, downstream of the sealing section, the system is provided with a filling section for filling individualized pouches. For example, filling is done via the fitment or via a non-sealed filling opening in between the walls, for example adjacent the fitment. This filling opening is then sealed by another sealing device.

The present invention also relates to a sealing station as disclosed herein, for the heat sealing of heat-sealable film material, preferably metal-free heat-sealable film material, e.g. of single polymer heat-sealable film material.

The present invention also relates to the combination of a sealing section as described herein comprising two or more sealing stations arranged in series along a linear path, and a film material drive station that is arranged downstream of the linear path through the sealing section, which film material drive station is configured to pull superimposed walls of heat-sealable film material at a constant velocity along the linear path past the sealing stations.

The present invention further relates to a jaw, or a pair of first and second jaws, as disclosed herein, configured for use in a sealing station for the heat sealing of heat-sealable film material, preferably metal-free heat-sealable film material, e.g. of single polymer heat-sealable film material.

The present invention also relates to a method for heat sealing of heat-sealable film material, preferably metal-free heat-sealable film material, e.g. of single polymer heat-sealable film material, e.g. in the production of pouches, e.g. pouches provided with a fitment, wherein use is made of a sealing station as disclosed herein, and/or the combination of a sealing section as described herein comprising two or more sealing stations arranged in series along a linear path, and a film material drive station that is arranged downstream of the linear path through the sealing section as described herein, and/or a jaw, or a pair of first and second jaws, as disclosed herein for use in a sealing station.

Further characteristics of the invention will be explained below, with reference to embodiments, which are displayed in the appended drawings, in which:

FIG. 1 depicts an embodiment of the sealing system in a pouch production machine according to the present invention, FIG. 2 depicts an infeed section of the sealing system of FIG. 1, FIG. 3 depicts a perforating station of the sealing system of FIG. 1, FIG. 4A depicts a fitment sealing station of the sealing system of FIG. 1, FIG. 4B depicts a close-up view on the fitment sealing station of FIG. 4A, FIG. 5A depicts a side seam sealing station and a bottom region sealing station of the sealing system of FIG. 1, FIG. 5B depicts a close-up view on the side seam sealing station of FIG. 5A, FIG. 5C depicts a close-up view on the bottom region sealing station of FIG. 5A, FIG. 6 depicts an film material drive station of the sealing system of FIG. 1, FIG. 7 depicts a cutting station of the sealing system of FIG. 1, FIG. 8 depicts a jaw of the fitment sealing station in FIG. 4A, FIG. 9 depicts a jaw of the side seam sealing station in FIG. 5A, FIG. 10 depicts a jaw of the bottom region sealing station in FIG. 5A, FIG. 11 depicts a schematic representation of the sealing system in FIG. 1, FIG. 12 schematically illustrates the operation of a continuous motion sealing station, FIG. 13 schematically shows the susceptor element and inductor of FIG. 8, FIG. 14 schematically shows a cross section of a jaw including the susceptor element and inductor, FIG. 15 schematically shows a cross section of a jaw including the susceptor element, inductor, and resilient backing layer of the susceptor element, and FIGS. 16A, B, C schematically show the electromagnetic field generated by the jaw of FIG. 8 and the interaction with the susceptor element.

Throughout the figures, the same reference numerals are used to refer to corresponding components or to components that have a corresponding function.

FIG. 1 shows an embodiment of the sealing system according to the present invention, to which is referred with reference numeral 1. The sealing system 1 comprises, seen along a linear path (T), a first sealing station, a second sealing station and a third sealing station, respectively embodied as a fitment sealing station 10, a side seam sealing station 20 and a bottom region sealing station 30.

The sealing stations 10, 20, 30 are arranged in series, each configured to heat seal a wall 101 made from heat-sealable film material, preferably metal-free heat-sealable film material for example single-polymer heat-sealable film material, superimposed onto one another wall 102 of heat-sealable film material, preferably metal-free heat-sealable film material for example single-polymer heat-sealable film material, and onto a fitment if present, to each create a respective sealed region in the production of pouches 100.

At the fitment sealing station 10, a plastic fitment 150 is placed between the walls 101, 102. The fitments 150 are supplied from a fitment storage 90 via two adjacent rails 91.

Accordingly, two fitments 150 are simultaneously placed in two respective non-bonded edge regions between the walls 101, 102. In the present embodiment, the fitments are embodied as spouts 150 for the discharging of product from the pouch 100.

At the fitment sealing station 10, the plastic fitment 150 is sealed with an attachment portion 151 thereof between the superimposed walls 101, 102. Until this sealing, both walls 101, 102 are not yet sealed against each other. As a result, the walls may be simply held at a distance from each other for receiving the fitment 150. After the sealing, the fitment 150 remains in place between the walls 101, 102.

According to the present embodiment, the fitment sealing station 10 is configured to seal two fitments 150 substantially simultaneously in between the two respective regions between the walls 101, 102 by means of two sets of fitment sealing jaws.

The side seam sealing station 20 is configured to heat seal two adjacent side regions of adjacent pouches in a string of still interconnected pouches 10 in order to establish a side or vertical seal of the pouch 100. In the present embodiment, the side seal in the bottom gusset pouch 100 extends across the triple point where the top of the gusseted portion adjoins the side of the pouch 100.

According to the present embodiment, the side seam sealing station 20 is configured to make two side seals simultaneously between the walls 101, 102 by means of two sets of side sealing jaws.

The bottom region sealing station 30 is configured to establish a bottom gusset seal of the pouch 100, e.g. a bottom seal within opposing side edges of the pouch 100. The sealing system according to this embodiment is configured to provide that the entire bottom gusset seal of the pouch 100 can be established with only a single heat impulse, providing for a fast and reliable sealing of bottom gusset.

According to the present embodiment, the bottom region sealing station 30 is configured to heat seal two bottom gusset regions simultaneously by means of two sets of bottom gusset region sealing jaws.

The sealing system comprises an infeed section with a roll handling station 40, adapted to receive multiple rolls of heat-sealable film material. The roll handling station 40 is located upstream of the sealing stations 10, 20, 30, when seen along the linear path (T). The infeed section is configured to dispense superimposed walls 101, 102 of single-polymer heat-sealable film material unwound from the rolls.

The sealing system 1 forms part of a pouch production machine that further an infeed section that is adapted and operated to form the film material dispensed by the roll handling station 40 into a string of interconnected pouches 100, each pouch 100 having a bottom gusset at its bottom region, being formed by two folded bottom lobes below a triple point of the pouch 100.

The infeed section further comprises a folding station 50, located downstream of the roll handling station 40 and configured to fold the film material dispensed from a single roll in the into two superimposed walls 101, 102 with a bottom gusset.

The sealing system 1 further comprises a film material drive station 60, which is configured to pull the walls 101, 102 of heat-sealable film material to be sealed along the linear, e.g. horizontal, path (T) at a constant velocity, said path extending along the folding station 50 and the sealing stations 10, 20, 30. Seen along the linear path (T), the drive station 60 is located downstream of the sealing stations 10, 20, 30.

Downstream of the drive station 60, a cutting station 70 is provided, which is configured to make one or more cuts to shape and separate the pouches 100 in part.

The sealing system 1 further comprises a perforating station 45, which is located, along the path (T), in between the roll handling station 40 and the folding station 50, as is best displayed in FIG. 2. The perforating station is configured 45 to perforate holes out of the film material, in order to enable both lobes of the bottom gusset to be sealed against each other. This is enabled by the perforated holes, which ensure that the outer walls of the gusset will face each other directly after folding of the film material.

The perforating station 45 is shown in more detail in FIG. 3 and comprises a frame part 46, which is fixedly attached to a stationary frame of the sealing system 1 and configured to remain stationary as well. The frame part 46 comprises a plurality of linear cylindrical guide shafts 47, which extend in an elongate direction. The cylindrical guide shafts 47 are fixedly attached to the frame part 46 and thus also configured to remain stationary. The perforating station 45 comprises a set of perforating jaws 48 that are slidably attached to the cylindrical guide shafts 47 by means of slider bearings 49. The slider bearings 49 each surround the cylindrical guide shafts 47 and are configured to only allow relative movements between the perforating jaws 48 and the frame part 46 along a perforation path (P), e.g. aligned in a horizontal direction. The perforation path (P) is aligned parallel to the path of the film material adjacent the perforating station 45.

In the present embodiment, the sealing system 1 comprises a motion device of the perforating station 45, not shown in FIGS. 2 and 3, for moving the perforating jaws 48 in synchronicity with the continuously moving film material along the path with respect to the frame part 46.

The folding station 50 comprises a plurality of rollers 51 to guide the unwound film material in an appropriate direction. Downstream of the rollers 51, the folding station 50 comprises a first folding plate 52 to fold the film material into two superimposed walls 101, 102. Downstream of the first folding plate 52, the folding station 50 comprises a second folding plate 52 to fold a respective bottom parts of the superimposed walls 101, 102 into two folded bottom lobes below a triple point of the pouch 100.

In FIGS. 4A and 4B, the fitment sealing station 10 is shown in more detail. The fitment sealing station 10 is configured to heat seal the plastic fitment 150 having the attachment portion 151 in a non-bonded edge region between the opposed first and second walls 101, 102 made from heat-sealable film material. The fitments 150 are supplied towards the fitment sealing stations 10 by means of two rails 91, which are located adjacent each other. At the end of each of the rails 91, a respective servo-operated gate 92 is provided to hold a fitment 150 in place at the end of each rail 91.

An advantage of first heat sealing the fitment 150 in a non-bonded edge region between the opposed walls 101, 102, prior to the sealing of one or more other regions to be heat sealed of the pouch 100, is that the superimposed film material walls 101, 102 are easily separated for introduction of the attachment portion 151 of the fitment 150 in this open edge region. Separation of this edge region is, in the present embodiment, done by a wedge member that is stationary arranged and that separates the walls 101, 102 in the edge region ahead of reaching the position for the fitment insertion.

The sealing system 1 further comprises two fitment inserters 93, which are located above the fitment sealing station 10 and which are configured to each pick up a fitment 150 at the servo-operated gate 92, e.g. which gate 92 is then opened. Each fitment inserter 93 is configured to bring a fitment 150 with its attachment portion 151 in the non-bonded edge region between the first wall 101 of heat-sealable film material and the second wall 102 of heat-sealable film material. To this effect, the fitment inserter 93 is configured to describe a rotary movement while gripping the fitment 150. As such, the fitment is lowered, with its attachment portion in between the walls 101, 102.

The fitment sealing station 10 comprises first jaws 11 and second jaws 12, in between which the walls 101, 102 of heat-sealable film material are arranged. Two first jaws 11, 11' are arranged next to each other and are opposed by two second jaws 12, 12', not visible in FIGS. 4A and 4B. In FIG. 8, one of the jaws 11 of the fitment sealing station 10 is shown in more detail, as will be described later. Each first jaw 11 has a first front surface, configured to contact a respective edge region of the first wall 101 and each second jaw 12 has a second front surface, configured to contact a respective edge region of the second wall 102.

The fitment sealing station 10 further comprises two actuator devices 13, e.g. presently embodied as servo-motors, for moving the jaws 11, 12 with respect to each other between an opened position and a clamped position. A first one of the actuator devices 13 is configured to move a first set of the jaws 11, 12 and a second one of the actuator devices 13' is configured to move a second set of the jaws 11', 12'. Each actuator device 13 is configured to hold its first jaw 11 and second jaw 12 in the closed position for a respective clamping duration. The actuator device 13, 13' are configured to operate independently of each other, which means that the first set of jaws 11, 12 may be moved between the opened and clamped position independently of the second set of jaws 11', 12'.

The fitment sealing station 10 further comprises a cooling device 14 that is configured to continuously cool both the first jaws 11 and the second jaws 12.

The fitment sealing station 10 is configured to perform an impulse sealing cycle with each set of jaws 11, 12. Each actuator device 13 is configured to move its first jaw 11 and second jaw 12 into the clamped position, so that the regions of the superimposed first wall 101 and second wall 102 are clamped against one another by the first jaw 11 and the second jaw 12.

The fitment sealing station 10 is configured to, in the clamped position, temporarily energize each susceptor element, so as to generate an impulse of heat that is emitted by each susceptor element. The impulse of heat seals the regions of the first walls 101 and the second wall 102 to each other. Both the first jaw 11 and second jaw 12 are cooled by the cooling device 14 after termination of the energizing of the susceptor element, e.g. since they are cooled continuously. Each actuator device 13 is configured to move its first jaw 11 and second jaw 12 into the opened position after the susceptor element has cooled down. With the jaws 11, 12 of the fitment sealing station 10 and the walls 101, 102 of heat-sealable film material are being cooled in the clamped position, their temperature relatively low when the jaws 11, 12 are brought in their opened positon.

The jaws 11, 12 of the fitment sealing station 10 are slidably arranged in the sealing system 1. The sealing system 1 thereto comprises multiple lower linear guides 3, which extend in an elongate direction. The lower linear guides 3 are fixedly attached to a stationary frame 2 of the sealing system 1 at a lower region thereof and are configured to remain stationary as well. The jaws 11, 12 are slidably attached to the lower linear guides 3 by means of slider bearings, which each surround the linear guides and are configured to only allow relative movements between the jaws 11, 12 and the frame 2 in a horizontal direction along the linear path (T) of the film material.

The fitment sealing station 10 further comprises a motion device 15 that is configured to reciprocally move its first jaws 11 and second jaws 12 in synchronicity with the continuously moving walls 101, 102 to be sealed during the impulse sealing cycle, e.g. when clamped between the jaws 11, 12. In the present embodiment, the reciprocal movement concerns a back-and-forth movement of the jaws 11, 12, during which the jaws 11, 12 are stopped at the end of a stroke to move back in the opposite direction. In the fitment sealing station 10, the combined stroke length is determined by the sum of the heat impulse duration and the clamped cooling duration times the velocity of the superimposed walls 101, 102.

During operation, the jaws 11, 12 of the fitment sealing station 10 are moved into clamped position by the actuator device 13 as soon as the fitment 150 is inserted between the superimposed walls 101, 102. At this point, the attachment portion 151 of the fitment 150 becomes clamped in between the walls 101, 102, e.g. in between the jaws 11, 12 of the fitment sealing station 10. Accordingly, the fitment 150 is moved along with the walls 101, 102 and the jaws 11, 12 along the linear path (T) during the sealing.

Downstream of the fitment sealing station 10, the side seam sealing station 20 is provided to heat seal two adjacent side regions of adjacent pouches 100, as is best displayed in FIGS. 5A and 5B. Similar as for the fitment sealing station 10, the side seam sealing station 20 comprises first jaws 21 and second jaws 22, in between which the walls 101, 102 of heat-sealable film material are arranged. Two first jaws 21, 21' are arranged next to each other and are opposed by two second jaws 22, 22', of which only one 22 is visible in FIGS. 5A and 5B. In FIG. 9, one of the jaws 21 of the side seam sealing station 20 is shown in more detail, as will be described later. Each first jaw 21 has a first front surface, configured to contact a respective side region of the first wall 101 and each second jaw 22 has a second front surface, configured to contact a respective side region of the second wall 102.

The side seam sealing station 20 further comprises an actuator device 23, e.g. presently embodied as a servo-motor, for moving the jaws 21, 22 with respect to each other between an opened position and a clamped position. The first jaws 21, 21' are attached to each other, to be moved together and the second jaws 22, 22' are attached to each other, to be moved together as well.

The side seam sealing station 20 further comprises a cooling device 24 configured to continuously cool both the first jaws 21 and the second jaws 22.

The side seam sealing station 20 is configured to perform an impulse sealing cycle with each set of jaws 21, 22 that is similar to the impulse sealing cycle that takes place in the fitment sealing station 10. In the side seam sealing station 20, however, a side seal, e.g. a vertical side seal, is made between for each two adjacent pouches 100. Each set of jaws 21, 22 is thereby configured to make a single side seal, which implies that two side seals, e.g. one for each set of jaws, are made simultaneously.

The jaws 21, 22 of the side seam sealing station 20 are slidably arranged in the sealing system 1. The sealing system 1 thereto comprises multiple upper linear guides 4, which extend in an elongate direction. The upper linear guides 4 are fixedly attached to the stationary frame 2 at an upper region thereof and are configured to remain stationary. The jaws 21, 22 are slidably attached to the upper linear guides 4 by means of slider bearings, which each surround the linear guides and are configured to only allow relative movements between the jaws 21, 22 and the frame 2 in a horizontal direction along the linear path (T) of the film material.

The side seam sealing station 20 also comprises a motion device 25, not visible in FIGS. 5A and 5B, that is configured to reciprocally move its first jaws 21 and second jaws 22 in synchronicity with the continuously moving walls 101, 102 to be sealed during the impulse sealing cycle, e.g. when clamped between the jaws 21, 22. In the present embodiment, the reciprocal movement concerns a back-and-forth movement of the jaws 21, 22, during which the jaws 21, 22 are stopped at the end of a stroke to move back in the opposite direction. In the side seam sealing station 20, the combined stroke length is determined by the sum of the heat impulse duration and the clamped cooling duration times the velocity of the superimposed walls 101, 102.

Downstream of the side seam sealing station 20, the bottom region sealing station 30 is provided to heat seal bottom regions of the pouches 100, as is best displayed in FIGS. 5A and 5C. Similar as for the side seam sealing station 20, the bottom region sealing station 30 comprises first jaws 31 and second jaws 32, in between which the walls 101, 102 of heat-sealable film material are arranged. Two first jaws 31, 31' are arranged next to each other and are opposed by two second jaws 32, 32', of which only one 32 is visible in FIGS. 5A and 5C. In FIG. 10, one of the jaws 31 of the bottom region sealing station 30 is shown in more detail, as will be described later. Each first jaw 31 has a first front surface, configured to contact a respective bottom gusset region of the first wall 101 and each second jaw 32 has a second front surface, configured to contact a respective bottom gusset region of the second wall 102.

The bottom region sealing station 30 further comprises an actuator device 33, e.g. presently embodied as a servo-motor, for moving the jaws 31, 32 with respect to each other between an opened position and a clamped position. The first jaws 31, 31' are attached to each other, to be moved together and the second jaws 32, 32' are attached to each other, to be moved together as well.

The bottom region sealing station 30 further comprises a cooling device 34 configured to continuously cool both the first jaws 31 and the second jaws 32.

The bottom region sealing station 30 is configured to perform an impulse sealing cycle with each set of jaws 31, 32 that is similar to the impulse sealing cycle that takes place in the side seam sealing station 20. In the bottom region sealing station 30, however, a bottom region seal, e.g. a bottom gusset seal, is made separately for each individual pouch 100. Each set of jaws is thereby configured to make a single bottom region seal, which implies that two bottom region seals, e.g. one for each set of jaws, are made simultaneously.

Both sets of jaws 31, 32 are spaced relatively wide from each other along the path (T), e.g. having a distance of pouch widths in between them, which is done to prevent interference between the susceptor elements of both sets of jaws 31, 32. In total, the bottom region sealing station 30 spans across four pouches 100, of which two are sealed every impulse sealing cycle.

The jaws 31, 32 of the bottom region sealing station 30 are slidably arranged in the sealing system 1. The jaws 31, 32 are slidably attached to the lower linear guides 3 by means of slider bearings, which each surround the linear guides and are configured to only allow relative movements between the jaws 31, 32 and the stationary frame 2 in a horizontal direction along the linear path (T) of the film material.

The bottom region sealing station 30 also comprises a motion device 35, not visible in FIGS. 5A and 5C, that is configured to reciprocally move its first jaws 31 and second jaws 32 in synchronicity with the continuously moving walls 101, 102 to be sealed during the impulse sealing cycle, e.g. when clamped between the jaws 31, 32. In the present embodiment, the reciprocal movement concerns a back-and-forth movement of the jaws 31, 32, during which the jaws 31, 32 are stopped at the end of a stroke to move back in the opposite direction. In the bottom region sealing station 30, the combined stroke length is determined by the sum of the heat impulse duration and the clamped cooling duration times the velocity of the superimposed walls 101, 102.

Downstream of the bottom region sealing station 30, the sealing system comprises a trimming station 55, which is configured to trim upper and lower corners of the pouches 100 in the string of still interconnected pouches, in order to shape the contours of the pouches 100. Trimming devices 56, e.g. punching or nothing devices, of the trimming station 55 are slidably arranged on the lower linear guides 3, in a manner substantially equivalent to the fitment sealing station 10 and the bottom region sealing station 30, and comprises a dedicated motion device to slide the trimming devices 56 with respect to the lower linear guides 3. The trimming station 55 further comprises a vacuum collection system with a vacuum source and a number of vacuum hoses 57, configured to remove trimmed-off pieces of the pouches 100 away from the trimming devices 56.

Downstream of the trimming station 55, the sealing system 1 comprises the film material drive station 60, which is provided with rollers 61 on opposite sides of the sealed walls 101, 102. The opposed rollers 61 are configured to clamp the walls 101, 102 in between them and are configured to be driven, e.g. by means of an electric motor 62, to pull the walls 101, 102 upon rolling of the rollers 61.

The cutting station 70 configured to individualize the pouches 100 is located downstream of the drive station 60, e.g. at a location in which no tensile pull force is present in the string of interconnected pouches 100. The cutting station 70 comprises multiple axially spaced apart sets, here two sets, of one or more mobile cutting blades. Here each set comprises a first blade 71 facing the first wall 101 and a second blade 72 facing the second wall 102 of the sealed pouches that are still in the form of an interconnected string of pouches. The blades 71, 72 are configured to make a cut between the sealed side regions of adjacent the pouches 100. During cutting, the blades 71, 72 are moved towards each other to cut each pouch 100, e.g. by a scissor-like shearing action between the blades 71, 72.

The cutting station 70 further comprises an actuator device 73, e.g. presently embodied as a servo-motor, for moving the blades 71, 72 with respect to each other to effect the cutting action. To effect the movement of the blades 71, 72, the actuator device 73 is connected to the blades 71, 72 via a rotary shaft 74 and a rocker mechanism 76. The first blades 71, 71' are attached to each other, to be moved together and the second jaws 72, 72' are attached to each other, to be moved together as well.

The cutting station 70 is configured to perform a cutting action severing the string of interconnected pouches 100 in order to individualize the pouches 100.

FIG. 6 illustrates pouch grippers 120 that are configured to grip each pouch 100. For example, the pouch grippers 120 are configured to transfer the pouches 100 to a filling section of the machine, e.g. for filling and capping the filled pouches 100. In another embodiment, the pouch grippers 120 convey the pouches into transport rails, wherein the fitments are slide into a rail so as to group the pouches.

In the example shown, each cut is made with each set of opposed blades 71, 72. Each set of blades is thereby configured to make a single vertical side cut, which implies that two vertical side cut, e.g. one for each set of blades, are made simultaneously. Accordingly, two separated individual pouches 100 are obtained with each cutting cycle.

The blades 71, 72 of the cutting station 70 are slidably arranged in the machine. The machine thereto comprises one or more linear guides 5, which extend in an axial direction.

The linear guides 5 are fixed to the stationary frame 2. The jaws 71, 72 are mounted on a slider that is slidably mounted on the linear guides 5.

The cutting station 70 may also comprises a motion device, that is configured to reciprocally move the blades 71, 72 in synchronicity with the continuously moving pouches 100, e.g. at least while making the cut. In the present embodiment, the reciprocal movement concerns a back-and-forth movement of the blades 71, 72, during which the blades 71, 72 are stopped at the end of a stroke to move back in the opposite direction.

With reference to FIG. 8, it is shown that each fitment sealing jaw 11 has a front surface 111 that defines a recess 112 configured to receive therein a half of the attachment portion 151 of the fitment 150. The first front surfaces 111 further defines, on opposite sides of the respective recessed face 112 and adjoining said recessed face 112, coplanar face portions 113. The front surface 111 of the jaw 11 is formed by an impulse heatable member that is embodied as a susceptor element 114, being covered by a heat-resistant non-stick covering. The susceptor element 114 extends along the recessed face portion 112 and the coplanar face portions 113 of the respective front surface 111. In operation, the fitment 150 is positioned with the attachment portion 151 thereof in the non-bonded edge region, between the opposed first and second walls 101, 102 made from heat-sealable film material.

Each of the jaws 11 is provided with a susceptor element 114 that comprises electrically conductive material and has a rear side facing away from the respective front surface 111. Each jaw 11 further comprises an inductor 115 which is electrically insulated from the susceptor element 114. The inductor 115 comprises an elongated inductor section that extends along the respective front surface 111 at the rear side of the susceptor element 114, which renders the inductor 115 to be invisible in FIG. 8.

The fitment sealing station 10 comprises a high frequency electric current source 16, which is connected to the inductor 115 of each of the first jaws 11, 11' and second jaws 12, 12' of the fitment sealing station 10 via respective connector terminals 117. The fitment sealing station 10 is configured so that, in the impulse sealing cycle, its electric current source 16 is operated to temporarily feed a high frequency electric current to the inductors 115 of the fitment sealing station 10, thereby generating a high frequency electromagnetic field with the inductors 115. The high frequency electromagnetic field induces eddy currents in the respective susceptor element 114, generating an impulse of heat that is emitted by the susceptor element 114. The impulses of heat seal the edge region of the walls 101, 102 to the attachment portion 151 of the fitment 150 and to each other.

The jaws 11 of the fitment sealing station 10 are configured, e.g. have a length (L), so that the entire non-bonded edge region in which the fitment 150 is inserted is sealed in one cycle by the operation of the jaws 11. So both the fitment 150 is secured in the edge region and the entirety of the edge region is sealed and closed.

The fitment sealing jaw 11 is cooled by the cooling device 14 of the fitment sealing station 10 and comprises two cooling ducts 118, e.g. one entry duct for guiding coolant towards the jaw 11 and one exit duct to guide the coolant away from the jaw 11. The cooling device 14 comprises a stationary mounted pumping and heat exchanger system, which is connected to the cooling ducts 118, and the cooling device 14 is configured to establish a continuous circulation of coolant, e.g. water, through the cooling ducts 118, e.g. during the entire impulse sealing cycle.

FIG. 9 depicts a sealing jaw 21 of the side seam sealing station 20. This side sealing jaw 21 has a substantially flat front surface 211 to contact side regions of the walls 101, 102, e.g. of two adjacent interconnected pouches 100. The front surface 211 is formed by an impulse heatable member that is embodied as a susceptor element 214, being covered by a heat-resistant non-stick covering.

Each of the jaws 21 is provided with a susceptor element 214 that comprises electrically conductive material and has a rear side facing away from the respective front surface 211. Each jaw 21 further comprises an inductor 215 which is electrically insulated from the susceptor element 214. The inductor 215 comprises two elongated inductor sections 216 that extend along the respective front surface 211 at the rear side of the susceptor element 214. The inductor 215 is longer than the susceptor element 214 and projects below the susceptor element 214, showing the two parallel inductor sections 216.

The side seam sealing station 20 comprises a high frequency electric current source 26, which is connected to the inductor 215 of each of the first jaws 21, 21' and second jaws 22, 22' of the side seam sealing station 20 via respective connector terminals 217. The side seam sealing station 20 is configured so that, in the impulse sealing cycle, its electric current source 26 is operated to temporarily feed a high frequency electric current to the inductors 215 of the side seam sealing station 20, thereby generating a high frequency electromagnetic field with the inductors 215. The high frequency electromagnetic field induces eddy currents in the respective susceptor element 214, generating an impulse of heat that is emitted by the susceptor element 214. The impulses of heat seal the side regions of the walls 101, 102 to each other to form side seals, e.g. vertical side seals of the pouches 100.

The side sealing jaw 21 is cooled by the cooling device 24 of the side seam sealing station 20 and comprises two cooling ducts 218, e.g. one entry duct for guiding coolant towards the jaw 21 and one exit duct to guide the coolant away from the jaw 21. The cooling device 24 comprises a stationary mounted pumping and heat exchanger system, which is connected to the cooling ducts 218, and the cooling device 24 is configured to establish a continuous circulation of coolant, e.g. water, through the cooling ducts 218, e.g. during the entire impulse sealing cycle.

In FIG. 10, a sealing jaw 31 of the bottom region sealing station 30 is depicted. This bottom region sealing jaw 31 has a substantially flat front surface 311 to contact bottom regions of the walls 101, 102, e.g. to contact bottom gusset regions of a pouch 100. The front surface 311 is formed by an impulse heatable member that is embodied as a susceptor element 314, here being covered by a heat-resistant non-stick covering.

The susceptor element 314 has a curved shaped, wherein side edges of the susceptor element 314 are located above a central region of the susceptor element 314. The shape of the sealed bottom gusset region of the pouch 100 is dictated by the shape of the susceptor element 314, which gives the result that the present susceptor element 314 is configured to provide a curved bottom gusset seal. This curved bottom gusset seal curves upwards towards both sides of each pouch 100 towards a triple point is present at each of the side edges of the pouch 100. Above the triple point, the first wall 101 and the second wall 102 are in direct contact with another and below the triple point, the two gusset portions are located between the first wall 101 and the second wall 102.

Each of the jaws 31 is provided with a susceptor element 314 that comprises electrically conductive material and has a rear side facing away from the respective front surface 311. Each jaw 31 further comprises an inductor 315 which is electrically insulated from the susceptor element 314. The inductor 315 comprises two elongated inductor sections 316 that extend along the respective front surface 311 at the rear side of the susceptor element 314. The inductor 315 is wider than the susceptor element 314 and projects beyond the susceptor element 314 at the side edges thereof, showing the two parallel inductor sections 316.

The bottom region sealing station 30 comprises a high frequency electric current source 36, which is connected to the inductor 315 of each of the first jaws 31, 31' and second jaws 22, 32' of the bottom region sealing station 30 via respective connector terminals 317. The bottom region sealing station 30 is configured so that, in the impulse sealing cycle, its electric current source 36 is operated to temporarily feed a high frequency electric current to the inductors 315 of the bottom region sealing station 30, thereby generating a high frequency electromagnetic field with the inductors 315. The high frequency electromagnetic field induces eddy currents in the respective susceptor element 314, generating an impulse of heat that is emitted by the susceptor element 314. The impulses of heat seal the side regions of the walls 101, 102 to each other to form bottom region seals, e.g. bottom gusset seals of the pouches 100.

The jaws 31 of the bottom region sealing station 30 are configured, e.g. have a length (L'), that corresponds to the width of the pouches, e.g. seen along the path (T), so that the entire non-bonded bottom gusset region of the pouch 100 is sealed in one cycle by the operation of the jaws 31.

The bottom region sealing jaw 31 is cooled by the cooling device 34 of the bottom region sealing station 30 and comprises two cooling ducts 318, e.g. one entry duct for guiding coolant towards the jaw 31 and one exit duct to guide the coolant away from the jaw 31. The cooling device 34 comprises a stationary mounted pumping and heat exchanger system, which is connected to the cooling ducts 318, and the cooling device 34 is configured to establish a continuous circulation of coolant, e.g. water, through the cooling ducts 318, e.g. during the entire impulse sealing cycle.

The frequency of the electric current supplied to the inductors 115, 125, 215, 225, 315, 325 is between 100 kHz and 1 MHz, for example between 250 kHz and 750 kHz.

The magnitude of the electric current supplied to the inductors 115, 125, 215, 225, 315, 325 is between 20 A and 600 A.

The electric current is supplied to the inductors 115, 125, 215, 225, 315, 325 at a voltage with a magnitude between 40 V and 500 V.

Each sealing station 10, 20, 30 is configured to provide a heat sealing impulse with its susceptor element 114, 124, 214, 224, 314, 324.

The heat-sealable film material is, preferably, a metal-free film material, for example a single-polymer film having multiple layers that consist of polyethylene (PE), e.g. low-density polyethylene (LDPE).

In the film material, preferably, any metal layer is absent. However, the film material may include a non-metallic barrier layer, e.g. a layer of ethylene vinyl alcohol (EVOH) as an oxygen barrier. For example, the EVOH layer is provided as an intermediate layer between outer and inner layers of polyethylene (PE).

The fitment 150 has, preferably, been molded from the same type of polymer as the walls 101, 102 of the pouch 100 to enhance recycling, for example being molded from a polyethylene (PE) material, e.g. from high-density polyethylene (HDPE).

A difference between the heat impulse temperature and a sealing temperature, e.g. a melting temperature of the heat-sealable film material and/or of the fitment 150, is referred to as a delta-T or delta-temperature. Preferably, the delta-T is less than 200° C., preferably less than 100° C., for example less than 50° C.

In a practical embodiment, with the walls 101, 102 being made of low-density polyethylene (LDPE) having a melting temperature of about 110° C., the heat impulse temperature is set below 300° C., preferably below 200° C., for example at 150° C.

The film material may be pre-printed, e.g. a surface print being provided, e.g. on the side that is contacted by the respective jaws 11, 12, 21, 22, 31, 32 of the sealing stations 10, 20, 30 having susceptor elements 114, 124, 214, 224, 314, 324. As explained, the inventive approach is not detrimental to the print on the film.

In embodiments, the heat impulse duration lies between 10 and 1000 milliseconds, e.g. between 20 and 500 milliseconds, e.g. between 75 and 400 milliseconds. The heat impulse duration may differ between sealing stations 10, 20, 30 as explained herein.

The cycle includes a clamped cooling phase directly following the heat impulse phase, during which clamped cooling phase the jaws 11, 12, 21, 22, 31, 32 are maintained in clamped position. In practical embodiments, the clamped cooling phase may have a duration between 200 and 800 milliseconds, e.g. between 300 and 600 milliseconds. The clamped cooling phase duration may differ between sealing stations 10, 20, 30 as explained herein.

In the sealing system 1, for each of the sealing stations 10, 20, 30, the heat impulse duration and the clamped cooling phase duration may be set independently.

FIG. 11 depicts a schematic representation of the sealing system 1 shown in FIG. 1 and described above, wherein the perforating station and the trimming station are omitted.

The sealing system 1 comprises a control unit 6, which is associated with the sealing stations 10, 20, 30, e.g. electrically connected to the sealing stations 10, 20, 30. The control unit 6 is, for each one of the sealing stations 10, 20, 30 independently, configured to control heat sealing by its at least one susceptor element 114, 124, 214, 224, 314, 324, e.g. to control the heat impulse intensity and/or duration. Furthermore, the control unit 6 is, for each of the sealing stations 10, 20, 30 independently, configured to control the actuator device 13, 23, 33 for moving the first jaws 11, 21, 31 and second jaws 12, 22, 32 relative to one another between the opened position and the clamped position to control the clamping duration, e.g. to control the clamped cooling duration.

The control unit 6 of the sealing system 1 is configured to control the impulse heating and/or the cooling for each of the sealing stations 10, 20, 30, which enables the temperature profile during the impulse sealing cycle to be controlled accurately and which may result in a reliable and reproducible seal that is being made with each of the sealing stations 10, 20, 30. Each parameter of each sealing station 10, 20, 30, for example the current fed to the inductor for the heat sealing impulse, the duration of the heat sealing impulse, the coolant temperature, cooling rate, clamped cooling duration, clamping force, clamping duration, and/or the duration of the return movement of the jaws 11, 12, 21, 22, 31, 32 may be controlled individually and independent of the velocity at which the superimposed walls 101, 102 of heat-sealable film material are moved along the sealing stations 10, 20, 30 and independent of an overall cycle duration of the complete impulse sealing cycle.

The control unit 6 is associated with the actuator device 13, 23, 33 of each sealing station 10, 20, 30 and is, for each one of the sealing stations 10, 20, 30 independently, configured to control the actuator device 13, 23, 33 to hold the first jaws 11, 21, 31 and second jaws 12, 22, 32 in the opened position and/or the clamped position for a certain predetermined period of time.

The control unit 6 is furthermore, for each of the sealing stations 10, 20, 30 independently, configured to control the actuator device 13, 23, 33 to apply a pre-determined clamping force between the first jaws 11, 21, 31 and second jaws 12, 22, 32 in the clamped position. The control unit 6 is able to independently determine for each of the sealing stations 10, 20, 30 at which clamping force the jaws are held in the clamped position. For one of the sealing stations, this predetermined amount of clamping force may be larger than for another one of the sealing stations, which implies that the flexibility to seal many different types of pouches 100, is improved.

The control unit 6 is associated with each cooling device 14, 24, 34 and is, for each one of the sealing stations 10, 20, 30 independently, configured to control cooling by its cooling device 14, 24, 34.

Each sealing station 10, 20, 30 comprises a temperature sensor in its first jaw 11, 21, 31 and its second jaw 12, 22, 32 that is linked to the control unit 6 and configured to sense and output the actual temperature of the respective jaw 11, 12, 21, 22, 31, 32. The control unit 6 is configured to control the heating and/or the cooling on the basis of the output of the temperature sensors. The temperature sensors are configured to output peak temperature values of the jaws 11, 12, 21, 22, 31, 32, e.g. representing a peak value of the jaw temperature for each of the impulse sealing cycles. The control unit 6 is configured to determine, when it is found that the temperature of a jaw 11, 12, 21, 22, 31, 32 is below a desired temperature level, to increase the heating input by the respective susceptor element of that jaw or to reduce the heating input when the temperature of a jaw is too high.

The control unit 6 is configured to adjust the temperature and flow rate of coolant circulated along the respective jaws 11, 12, 21, 22, 31, 32, for example on the basis of the output of the temperature sensors in the jaws 11, 12, 21, 22, 31, 32. By controlling the temperature and the flow rate, the control unit 6 is able to control the cooling power of the cooling devices 14, 24, 34, e.g. to achieve a cooling profile that optimally suits the type of seal that is to be made.

Each cooling device 14, 24, 34 comprises a coolant temperature sensor to sense and output the actual temperature of the coolant in the cooling device 14, 24, 34 and comprises a coolant flow sensor to sense and output a flow rate of the coolant in the cooling device 14, 24, 34. The control unit 6 is connected to these coolant temperature sensors and coolant flow sensors and is further configured to adjust the temperature and flow rate of coolant circulated along the respective jaws 11, 12, 21, 22, 31, 32 on the basis of the output of the coolant temperature sensors and the coolant flow sensors. The control unit 6 is configured to determine, when it is found that the temperature of the coolant is above a desired temperature level, to lower the temperature of the coolant that is pumped towards that respective jaw or to increase the flow rate of the coolant towards that respective jaw.

The control unit 6 is associated with the electric current source 16, 26, 36 of each sealing station 10, 20, 30 and is, for each one of the sealing stations 10, 20, 30 independently and individually, configured to adjust the current that is fed to the inductor 115, 215, 315, for example on the basis of the output of the temperature sensors in the jaws 11, 12, 21, 22, 31, 32. The adjusting of the electric current sources 16, 26, 36 may involve the adjusting of the magnitude of the current, the duration of the current, and/or the frequency of the current, in order to control the electromagnetic field generated by the respective inductor 115, 215, 315, thereby controlling the induced eddy currents and heat impulse from the respective susceptor element 114, 214, 314.

The control unit 6 may be configured to control the high frequency current sources 16, 26, 36 in view of a preheating of the jaws 11, 12, 21, 22, 31, 32. The control unit 6 is configured to control a preheating by means of the susceptor elements 114, 214, 314 before the jaws 11, 12, 21, 22, 31, 32 are moved in the clamped position and/or to control a preheating by means of the susceptor elements 114, 214, 314 whilst the jaws 11, 12, 21, 22, 31, 32 are in the clamped position.

The control unit 6 is associated with the motion device 15, 25, 35 of each sealing station 10, 20, 30 and is, for each one of the sealing stations 10, 20, 30 independently, configured to control the motion device 15, 25, 35 for moving the first jaws 11, 21, 31 and second jaws 12, 22, 32 in synchronicity with the continuously moving walls 101, 102. The present independent controlling of each motion device 15, 25, 35 enables each set of jaws 11, 12, 21, 22, 31, 32 of each respective sealing station 10, 20, 30 to be moved along with the walls 101, 102 over a different stroke length.

The control unit 6 is configured to control the motion device 15 of the first sealing station 10, the motion device 25 of the second sealing station 20 and the motion device 35 of the third sealing station 30 to adjust the position of the first jaw 11 and the second jaw 12 of the first sealing station 10 with respect to the position of the first jaw 21 and the second jaw 22 of the second sealing station 20 and/or with respect to the position of the first jaw 31 and the second jaw 32 of the third sealing station 30, in order to adjust a mutual distance between them along the linear path (T).

Each sealing station 10, 20, 30 comprises a position sensor, for example an optical position sensor in its first jaw 11, 21, 31 and its second jaw 12, 22, 31 that is linked to the control unit 6 and configured to sense and output the position of the respective jaw 11, 12, 21, 22, 31, 32, e.g. with respect to a fixed reference and with respect to the walls 101, 102 of heat-sealable film material. The control unit 6 is configured to control the motion devices 15, 25, 35 on the basis of the output of the position sensors.

The control unit 6 is associated with the electric motor 60 of the film material drive station 60 and is configured to control actuation of the electric motor 60 to activate or deactivate rotation of the one or more film drive rollers 61 and to control the velocity at which the rollers 61 are rotated by the electric motor 62, e.g. to control the pulling force that is exerted on the walls 101, 102 of film material and unwinding of the roll with film material in the roll handling station 40.

The control unit 6 connected to actuator device 73 of the cutting station 70 and configured to control the movement of the cutting blades 71, 72 by the actuator device 73, to control cutting of the walls 101, 102 of film material into separated individual pouches 100.

The control unit 6 is further connected to the motion device 75 of the cutting station 70 is configured to control the motion device 75 for moving the blades 71, 72 of the cutting station 70 in synchronicity with the continuously moving pouches 100. The movement of the cutting station 70 can be controlled individually, in order to correspond to the velocity of the moving pouches 100, which enables many different types of pouches 100 to be cut with the same cutting station 70.

The control unit 6 is configured to control by means of a feedback-type control mechanism, such that measured values during a first impulse sealing cycle form the basis for controlling the impulse heating, the cooling and the moving of the jaws 11, 12, 21, 22, 31, 32 for subsequent impulse sealing cycles. Measured parameters during earlier impulse sealing cycles are thereby used to serve as a basis for controlling later impulse sealing cycles.

The control unit 6 is further configured to log sealing parameters, such as one or more actual settings for the impulse heating, the cooling and the moving of the jaws 11, 12, 21, 22, 31, 32. By logging the sealing parameters, one may be able to retrieve afterwards which seal, e.g. of which pouch 100, has been made at which specific setting(s).

The control unit 6 is provided with a memory 7 in which, for multiple different seal configurations, e.g. for multiple different types of pouches 100, a respective data set representing settings for the susceptor elements 114, 214, 314 heated by means of the electric current sources 16, 26, 36, the cooling devices 14, 24, 34, the actuator devices 13, 23, 33, 73, and the motion devices 15, 25, 35, 75 is stored. The data set does, for each of the different seal configurations, comprise a profile of parameters for each sealing station 10, 20, 30. The parameters comprise the sealing temperature, heating rate and heating duration for each susceptor element 114, 214, 314, the cooling temperature, cooling rate and cooling duration for each cooling device 14, 24, 34, the clamping force, clamping duration and cutting action for each actuator device 13, 23, 33, 73, and the accelerations, velocities, start positions, stop positions and duration of the return movement of the jaws 11, 12, 21, 22, 31, 32 or blades 71, 72 for each motion device 15, 25, 35, 75.

The sealing system 1 further comprises a touchscreen 8, configured to display thereon the selected seal configuration in graphical form, e.g. as a graph or graphs representing dimensions and temperatures. This touchscreen 8 display enables a machine operator to review the respective parameters and may enable for convenient verification whether the sealing system 1 has been set up correctly, e.g. for the correct seal configuration.

The touchscreen 8 further allows a machine operator to select a seal configuration, e.g. pouch type, upon which the control unit 6 is configured to select the appropriate data set accordingly. This contributes to the flexibility of the sealing system 1 and enables convenient switching between parameters for many different types of pouches 100, all with different parameters for the impulse heating, the cooling, the actuator devices 13, 23, 34, 73 and the motion devices 15, 25, 35, 75, to be sealed with the same sealing system 1, without requiring complex modifications of the sealing system 1. It is not required to interchange jaws 11, 12, 21, 22, 31, 32 when switching between different seal configurations, since all parameters are set automatically via the control unit 6.

In FIG. 12, the impulse sealing of top edge regions of a first pouch wall 101 and of a second pouch wall 102, is displayed schematically by means of steps (a)-(e).

In the displayed embodiment, the sealing station 200 comprises a first jaw 210 and a second jaw 220. During the production of the pouches, the pouch walls 101, 102 are moved continuously along a linear path (T), from left to right in FIG. 12, e.g. at a constant speed. For example, in practice, a continuous web having two opposed walls of heat-sealable film material, e.g. with a bottom gusset, is pulled along the linear path in between the jaws 210, 220 of the sealing device. Therefore, the pouch walls 101, 102 of a pouch to be made are still interconnected with adjoining pouch walls, e.g. as a string of still interconnected pouches.

The sealing station 200 is configured to move along with the pouch walls 101, 102 along the linear path (T), at least during the sealing cycle, e.g. when the walls 101, 102 are clamped between the jaws 210, 220.

The cycle is started with step (a), shown on the left side of FIG. 12. The first jaw 210 and the second jaw 220 are initially in a position spaced from the pouch walls 101, 102 that may still be somewhat opened in in upper region.

Upon operation of the first actuator device 201, the first jaw 210 is moved towards its clamped position, wherein the first jaw 210 comes in contact with the first pouch wall 101. Similarly, the second jaw 220 is moved towards its clamped position by the second actuator device 202, wherein the second jaw 220 comes in contact with the second pouch wall 102. In the respective clamped positions, the first pouch wall 101 and the second pouch wall 102 are lightly clamped onto one another in the region of the seam to be formed along the upper edge. The clamping is lightly as no pressure is involved in the sealing process.

Next, during step (b), the jaws 210, 220 remain in their respective clamped positions and move along with the pouch walls 101, 102. Step (b) is an impulse sealing step, during which an electromagnetic field is provided in a first inductor 211 and in a second inductor 221, in order to induce respective heat impulses in a first susceptor 212 and in a second susceptor 222.

Under the influence of the heat impulses, the first pouch wall 101 and the second pouch wall 102 are locally fused with each other along the seam, in order to seal the pouch walls 101, 102 against each other.

During step (c), the heat impulses are no longer provided as the inductors are no longer energized, but the jaws 210, 220 remain in their clamped positions. Cooling fluid is being circulated through the ducts 214 in the jaws 210, 220. This supply of cooling fluid may be continued during all steps (a)-(e) of the process. Accordingly, heat is removed from the sealed pouch 100 as well.

During step (d), the first jaw 210 and the second jaw 220 are moved away from each other, into the opened position. As such, the sealed pouch 100 may be taken over by a further handling device, to allow for further processing thereof, such as packaging. Upon moving them away from each other, the jaws 210, 220 again become spaced.

Finally, during step (e), the first jaw 210 and the second jaw 220 are moved back towards their initial position. This movement may take place in a direction opposite to the linear path (T), in order to effect that the jaws 210, 220 become arranged in their initial positions, similar as on the onset of step (a).

After moving the jaws 210, 220 back during step (e), the cycle is repeated, starting with step (a) again.

It will be appreciated that the path of the jaws 210, 220 can be of any suitable shape, e.g. circular, oval, linear, etc.

For example, the jaws 210, 220 are mounted on a reciprocating support that moves in reciprocating manner parallel to the direction of transportation. Cooling liquid can be circulated along the jaws with flexible hoses.

It is shown in FIG. 13, that a jaw 11 of the fitment sealing station 10 comprises an inductor 115 with one pair of elongated inductor sections 115a, b that are parallel to one another and vertically spaced from one another by a horizontal slit 115c. The pair of inductor sections is arranged in proximity of the rear side of the susceptor element 114.

In an embodiment, the elongated inductor sections 115a, b are made from a metal, e.g. of copper.

It is shown in FIG. 13, that the at least one elongated inductor section 115a, b is a solid cross-section metal or other, preferably high conductivity material inductor section, e.g. made of copper which is preferred. This arrangement allows to avoid undue variations of current density within the inductor section, and thereby undesirable variation in the generated field, e.g. compared to an internally hollow inductor section.

It is shown in FIG. 13, that the at least one elongated inductor section 115a, b has a constant cross-section, preferably a solid cross-section, over its length along the contoured front surface of the respective jaw 11. This design avoids undue variations of current density within the inductor section, which might otherwise occur at locations where the cross-section changes, and thereby undesirable variation in the generated field.

It is shown in FIG. 13, that the uniform cross-section elongated inductor section 115a, b has, seen in a top view onto the jaw 11, a shape corresponding to the contoured front surface of the jaw and maintains a uniform distance between the susceptor element 114 and the elongated inductor section 115a, b. This arrangement enhances uniformity of the development of heat in the susceptor element.

In alternative embodiments, the inductor may have a non-constant cross-section, for example locally having a cross-section that is narrower than a nominal cross-section, to increase locally the current density for the high-frequency electric current, in order to locally increase the intensity of the heat impulse emitted by the susceptor element.

In embodiments, the distance between the inductor and the susceptor element may locally vary from the uniform, e.g. nominal distance between the inductor and the susceptor element. With a distance that is locally narrower, for example, the electric magnetic field in the susceptor is increased locally, in order to locally increase the intensity of the heat impulse emitted by the susceptor element.

The horizontal slit FIG. 13c can be air slit or a slit filled with electrically insulating material.

In embodiments, said slit 115c between neighbouring inductor sections 115a, b that are arranged above one another has a height between 0.01 and 5 mm, more preferably between 0.1 and 2 mm.

The presence of the slit 115c between the parallel elongated inductor sections 115a, b allows for a desirable concentration of the field that is generated by the inductor of the jaw onto the susceptor element 114. This is illustrated in FIGS. 16A, B, and C.

As explained herein, the field is fairly homogenous, which enhances homogeneity of the impulse heating of the susceptor 114 and thereby the quality and reliability of the sealing process. In particular, undue variations in temperatures to which the film material is subjected are avoided, which would otherwise arise if the field were irregular.

Figure 13:
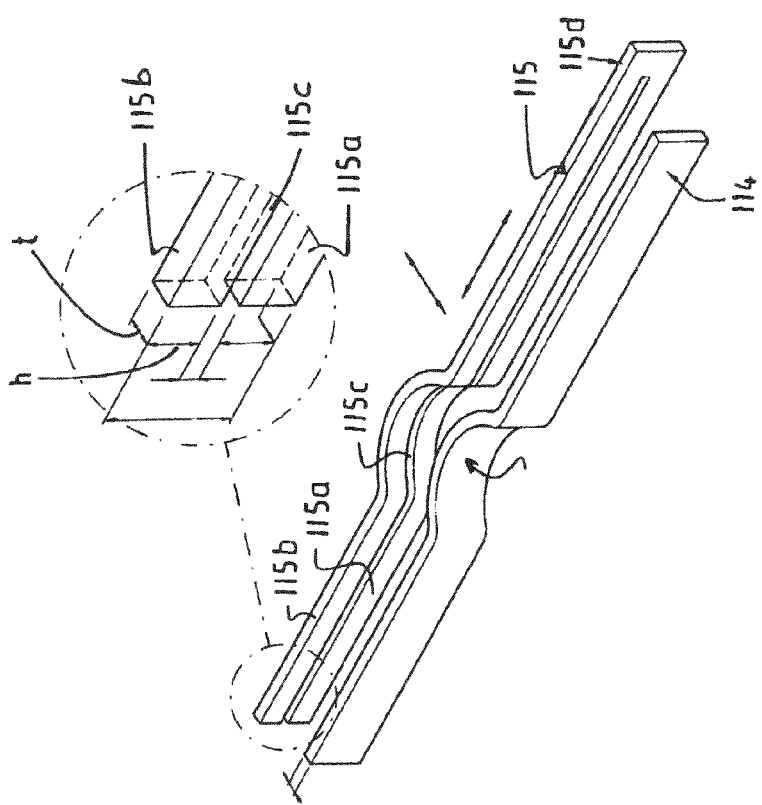

It is shown in FIG. 13, that the susceptor element 114 extends, seen in a view onto the front surface 111 of the jaw 11, over the horizontal slit 115c between the parallel inductor sections 115a,b.

It is shown in FIG. 13, that the susceptor element 114, seen in a view onto the front of the jaw 11, extends over the slit 115c between parallel elongated inductor sections 115a, b and overlaps in said view with each of the parallel inductor sections 115a, b.

It is shown in FIG. 13, that the susceptor element 114 is embodied as one strip that extends over the slit 115c between parallel elongated inductor sections 115a, b and overlaps in said view with each of the parallel inductor sections 115a, b.

It is shown in FIG. 13, that a strip shaped susceptor element 114 has an upper edge and a lower edge defining a height of the strip, wherein the height of the strip is at least 50% of the height of the single pair of inductor sections 115a, b including the slit 115c that are arranged at the rear of the strip above one another, e.g. between 75% and 125% of said height, e.g. about 100% of said height.

It is shown in FIG. 13, that a strip shaped susceptor element 114 has an upper edge and a lower edge defining a height of the strip, wherein the inductor of a jaw comprises a number of, e.g. multiple, inductor sections 115a, b that each extend along the rear side of the susceptor element. Herein the height of the strip is preferably at most the same as the height of the number of one or more inductor sections, preferably the upper edge and the lower edge of the strip not protruding above and below the height of the one or more inductor sections.

It is shown in FIG. 13, that the inductor of the jaw 11 is embodied so that in a pair of adjacent and parallel inductor sections 115a, b arranged at the rear side of the susceptor element 114, the current flows in opposite directions through the inductor sections.

It is shown in FIG. 13, that the inductor 115 of the jaw 11 comprises a C-shaped inductor element having parallel first and second inductor sections interconnected at one axial end of the inductor, e.g. by a connecting portion 115d integral with the inductor sections, in series, wherein the free ends of the inductor sections have terminals for electrical connection to the current source. The connection portion 115d is, as preferred, located outside the region where the susceptor element 114 is located, as the connector portion 115d is likely to show irregular field effects that might lead to non-homogeneity of the heating of the susceptor element.

It is shown in FIG. 13, that the inductor 115 of the jaw 11 comprises a C-shaped inductor element having parallel first and second inductor sections 115a, b interconnected in series and arranged above one another, wherein the inductor sections are separated by a horizontal slit 115c, e.g. an air slit or a slit filled with electrically insulation material.

It is shown in FIG. 13, that the inductor 115 of the jaw 11 comprises multiple, e.g. just two, elongated inductor sections 115a,b arranged parallel to one another and arranged above one another behind the susceptor element 114.

In an embodiment, the at least one elongated inductor section 115a, b has a thickness "t" of between 1.0 and 4.0 mm, seen perpendicular to the front surface of the jaw, for example between 1.5 and 3.0 mm. The limited thickness of the inductor element enhances the cooling of the jaw, including the inductor of the jaw, e.g. as one or more cooling fluid ducts are preferably arranged in proximity of a rear side of the at least one inductor element.

In an embodiment, the at least one elongated inductor section 115a,b has a rectangular cross-section with a height "h" that is greater than the thickness "t" of the inductor section. This arrangement allows to limit the thickness, which allows for efficient cooling.

Figure 14:
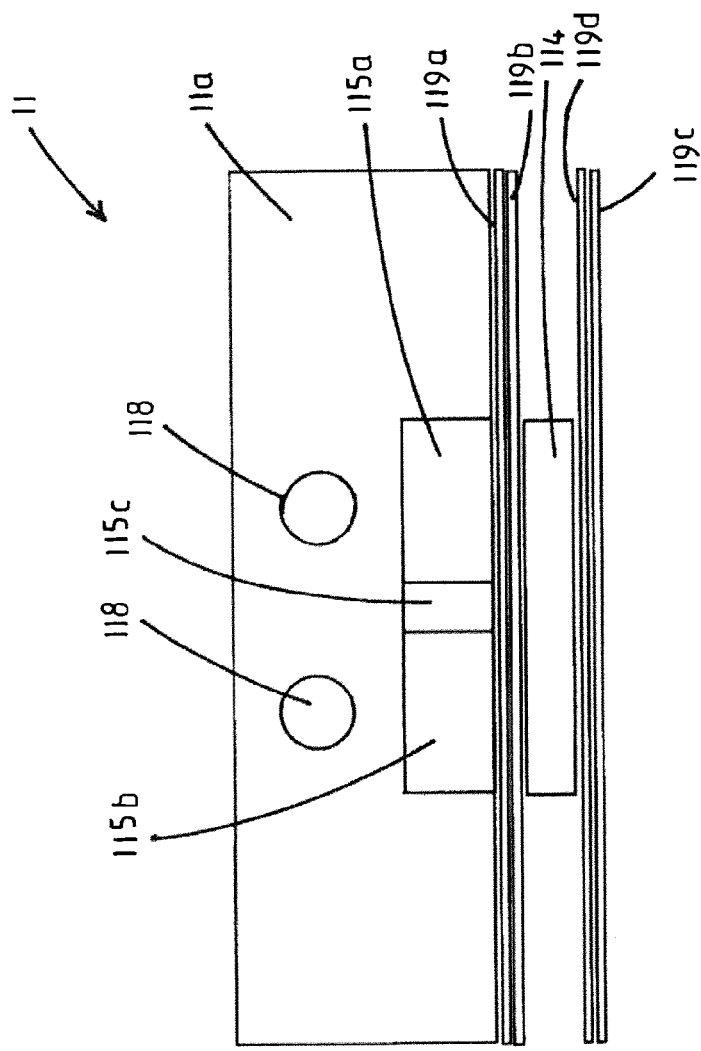

It is shown in FIG. 14, that each jaw may be provided with one or more cooling fluid ducts 118, e.g. the cooling fluid being a cooling liquid, e.g. water, being passed through the cooling fluid ducts 118, e.g. using a pump assembly, e.g. a cooling liquid circuit being a closed circuit including a heat exchanger configured to remove heat from the cooling liquid.

Preferably, no cooling fluid is passed in a region between the inductor 115 and the susceptor 115 as that would unduly increase the distance between them and would impair effectivity of the impulse heating induced by the field. It will be appreciated, that in view of the desired very close proximity of the susceptor element 114 to the front surface 111 of the jaw 11, there is in practice no space for any cooling duct in said region. So, in practical embodiments, cooling of the jaw 11 is preferably done using a control flow of cooling fluid, e.g. liquid, through one or more ducts 118 that are arranged behind, and preferably in close proximity to, the inductor sections 115a, b.

In an embodiment, at least one cooling fluid duct 118 extends along the at least one inductor section 115a, b that extends along the rear side of the susceptor element 114.

It is preferred for the system 1 to be configured such that cooling of the jaws is active during the entire impulse sealing cycle, so also during the creation of the heat impulse which happens so fast that it is generally not impaired by the cooling. In another configuration the cooling may be interrupted or reduced around the moment of the heat impulse.

In an embodiment, the susceptor element 114 is made of metal material, e.g. a metal or a metal alloy, e.g. of a thin metal strip.

For example, the susceptor element 114 is made of, or comprises, aluminium, nickel, silver, stainless steel, molybdenum and/or nickel-chrome.

It is shown in FIG. 13, that the susceptor element 114 is embodied as a strip having opposed front and rear main faces that define the thickness of the strip between them. In an embodiment, the thickness of the susceptor element strip 114 is constant over the extension of the strip.

In embodiments, the thickness of the susceptor element may differ locally from a nominal thickness. For example, the susceptor element may comprise a thickened portion at its rear surface, e.g. facing away from the front surface of the jaw, to locally increase the intensity of the electromagnetic field in the susceptor element, in order to locally increase the intensity of the heat impulse that is emitted by the susceptor element.

It is shown in FIG. 13, that the susceptor element 114 is embodied as a planar strip, most preferably the jaw having a single planar strip susceptor element. This arrangement as a planar strip is in particular preferred for the handling of plastic fitments that have an attachment portion with planar and preferably smooth sealing faces.

Figure 1:
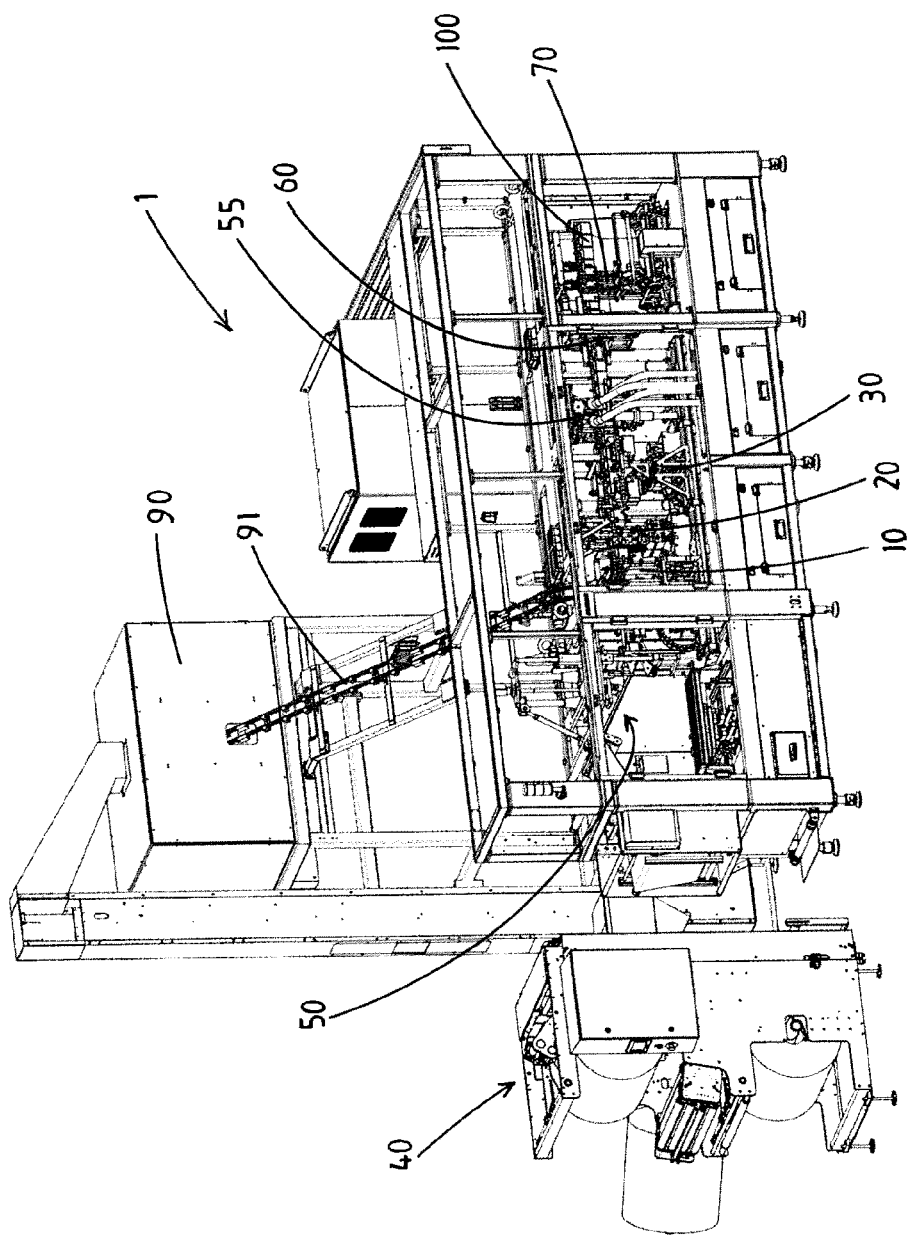
Figure 2:
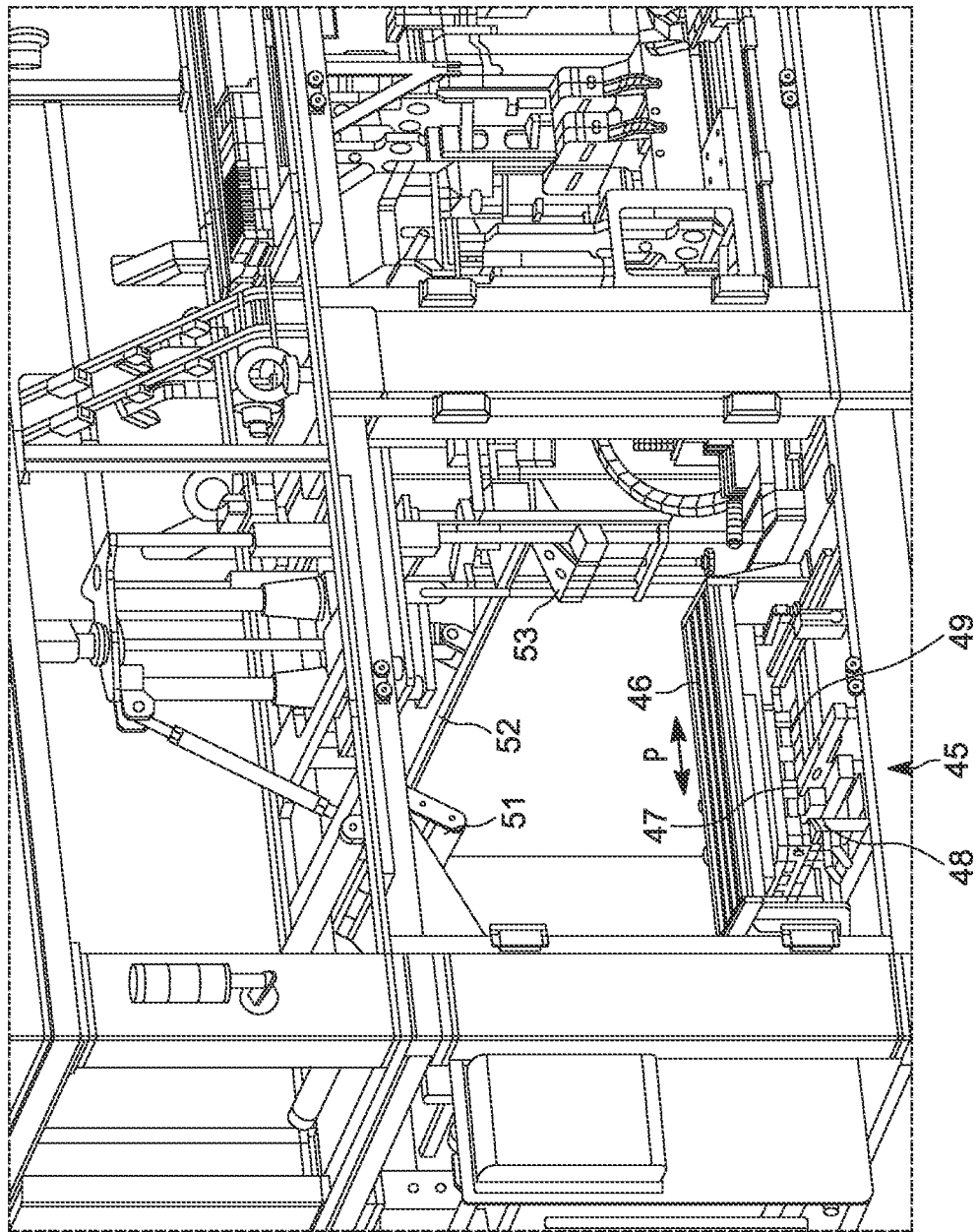
Figure 3:
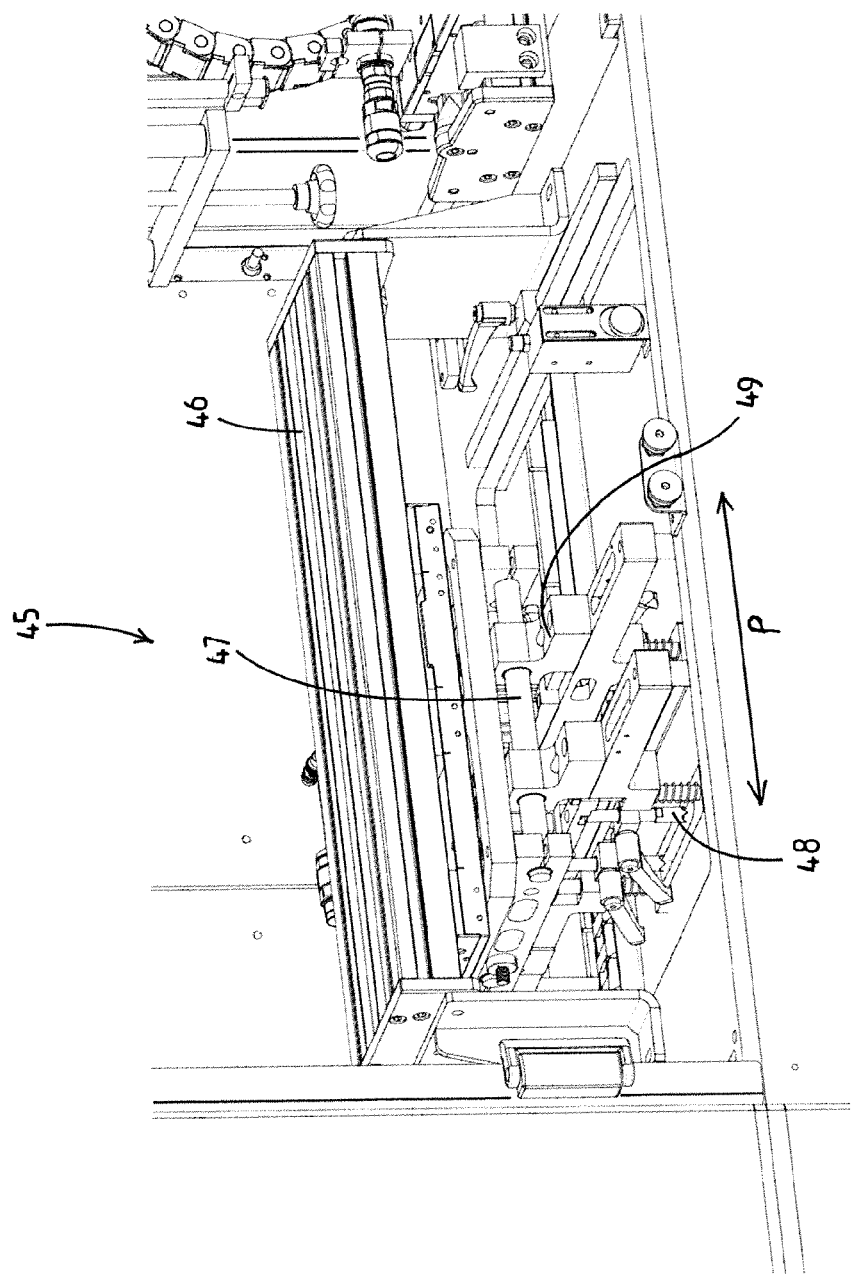
Figure 4A:
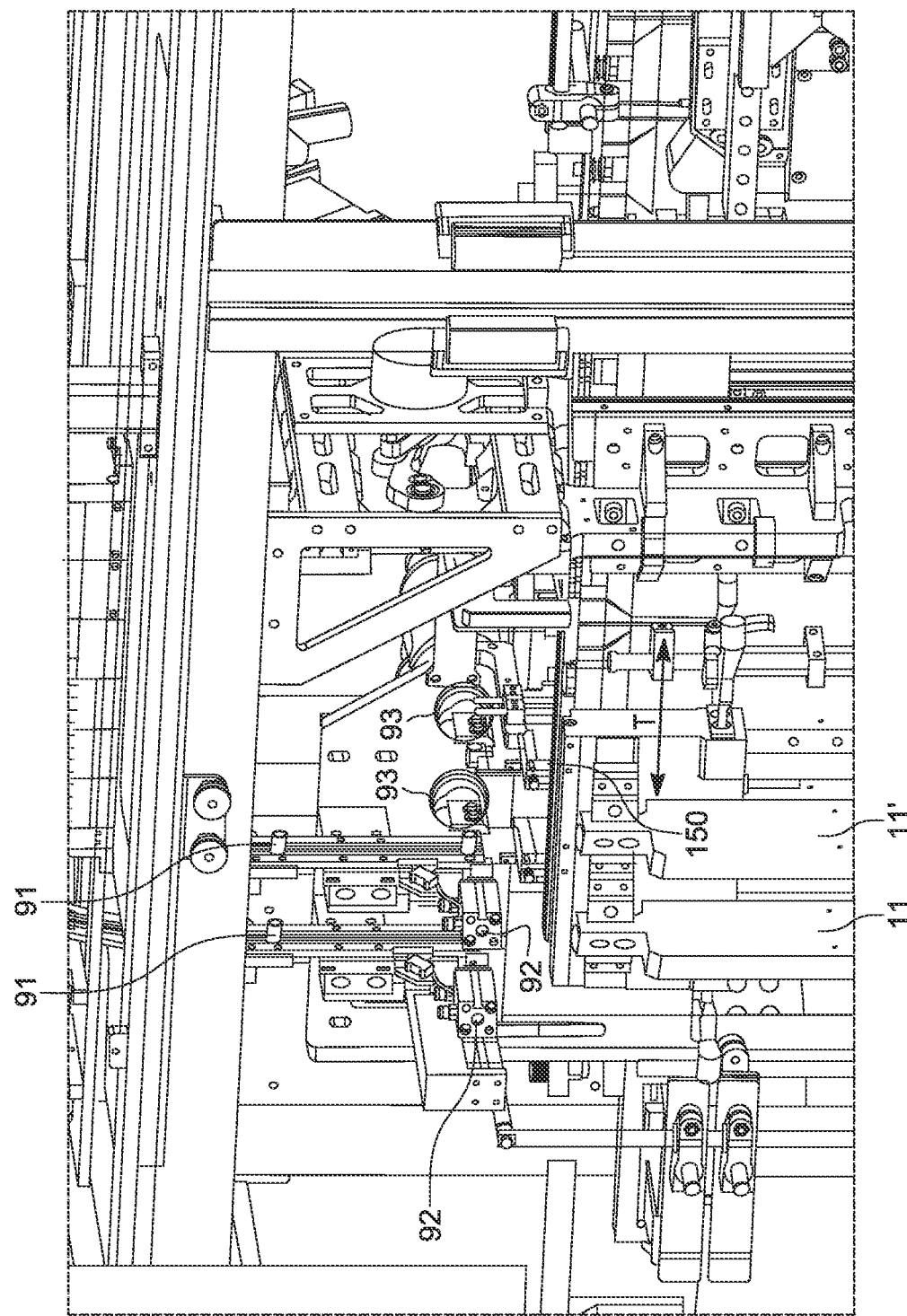
Figure 4B:
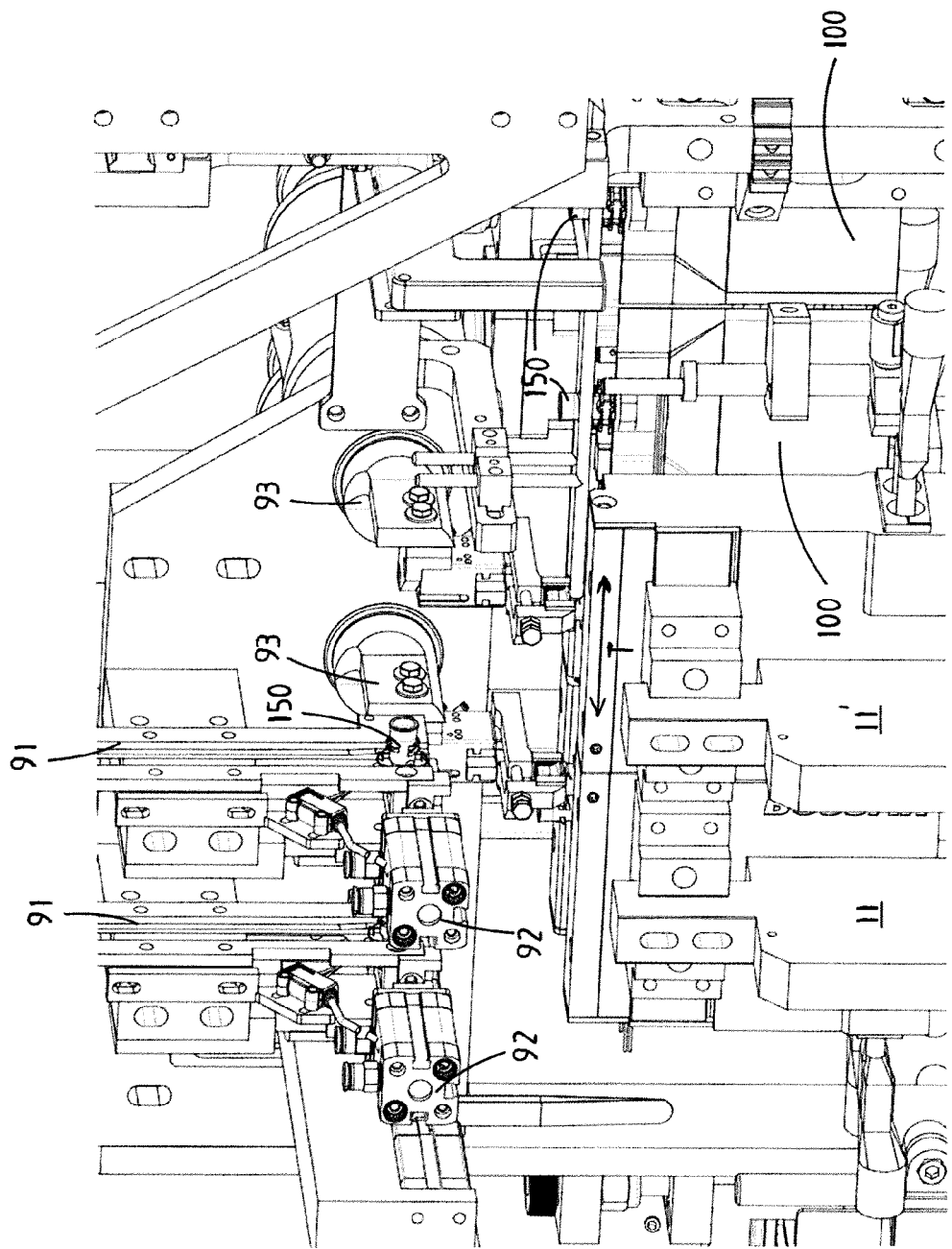
Figure 5A:
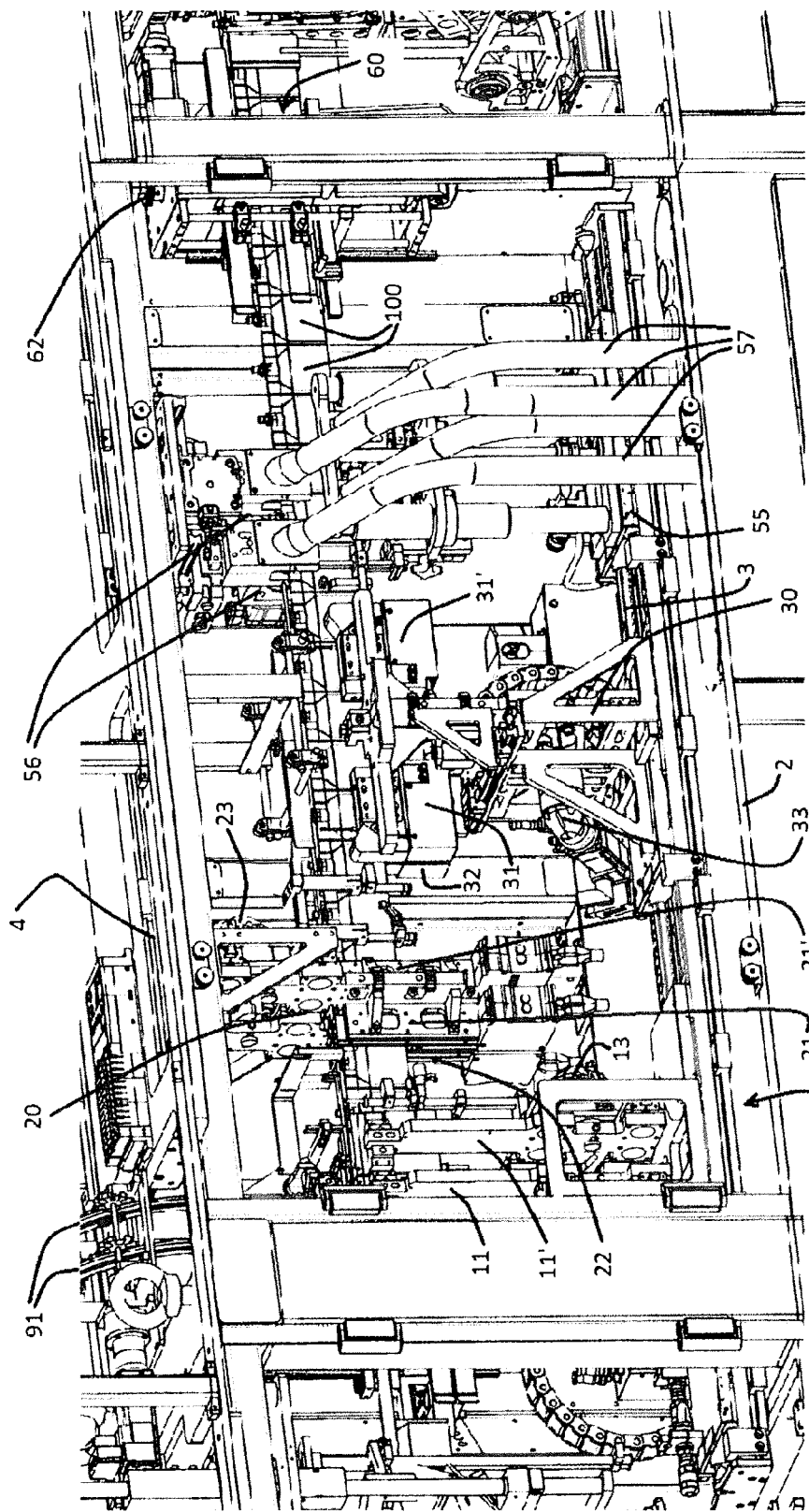
Figure 5B:
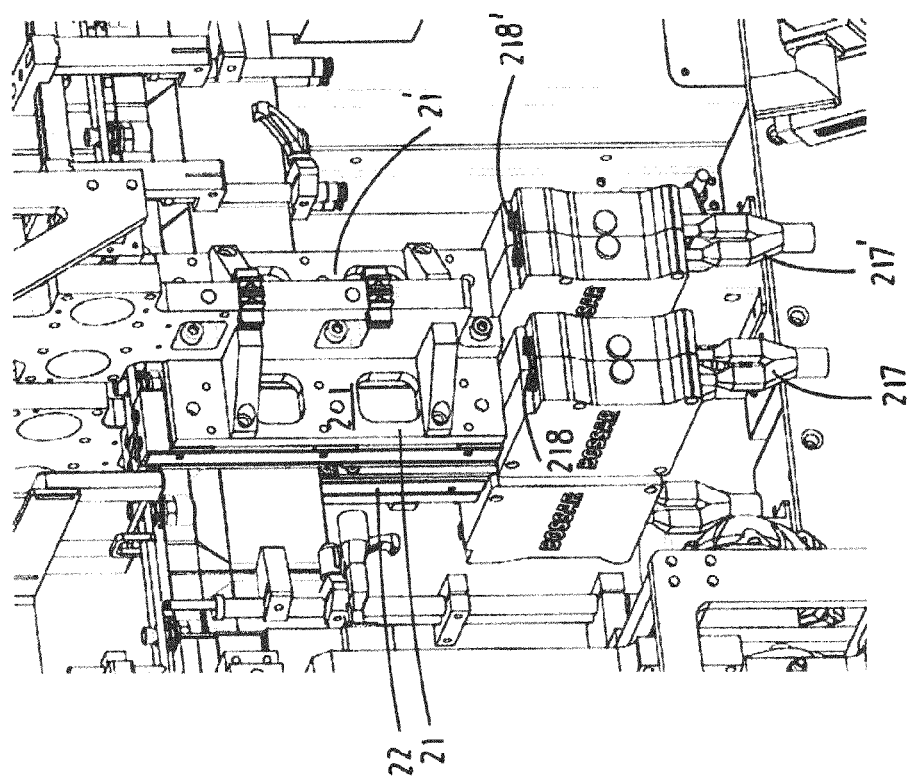
Figure 5C:
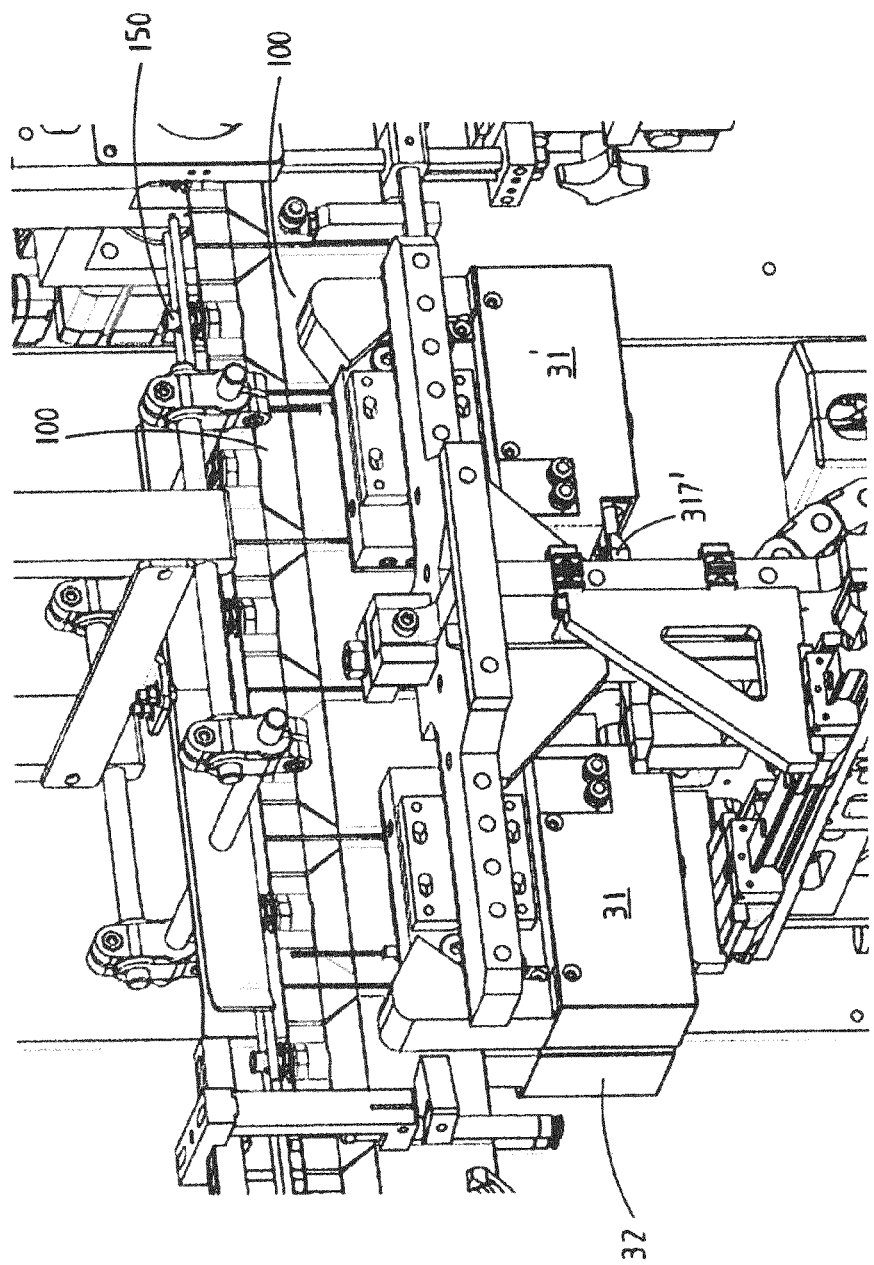
Figure 6:
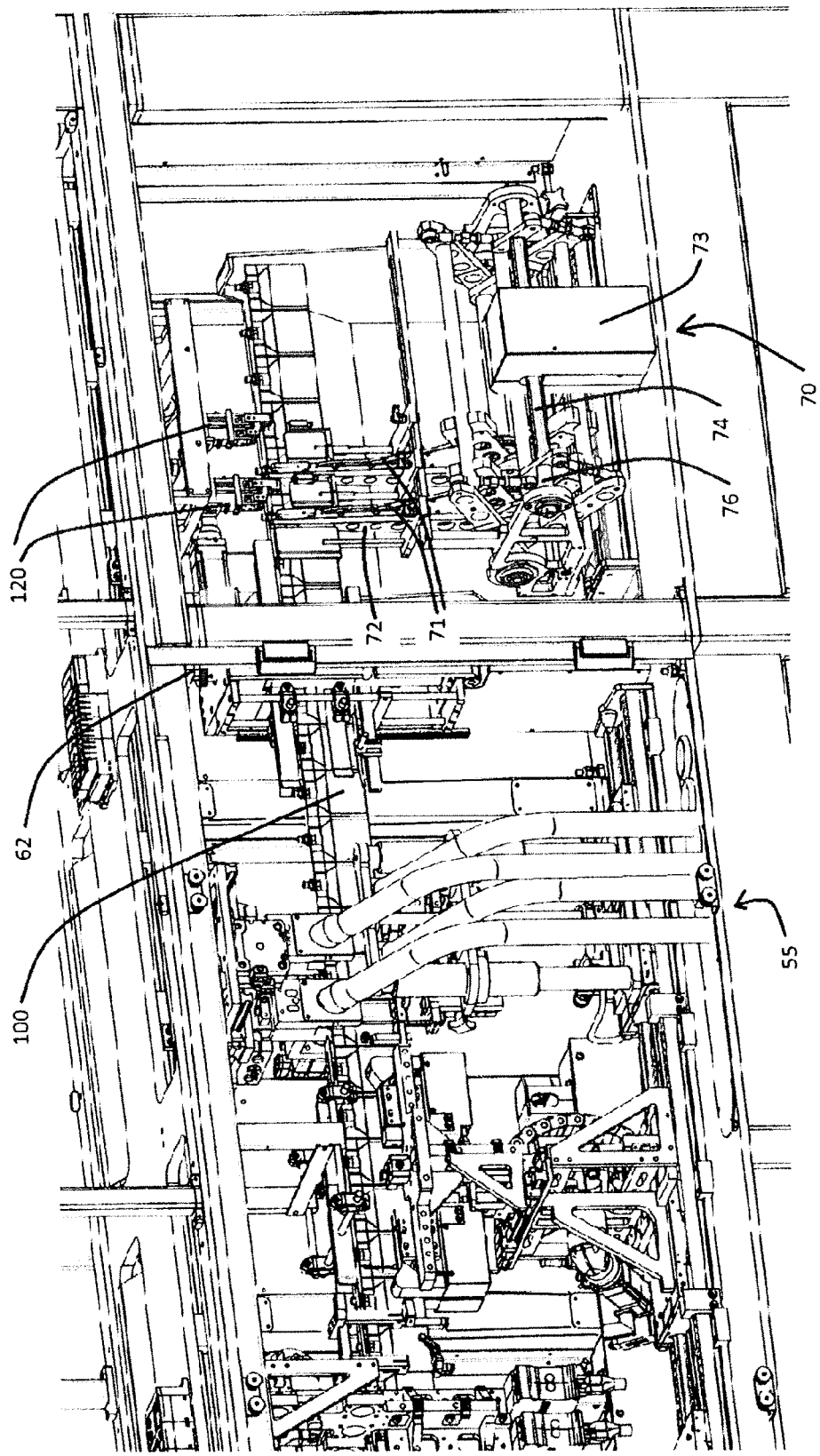
Figure 7:
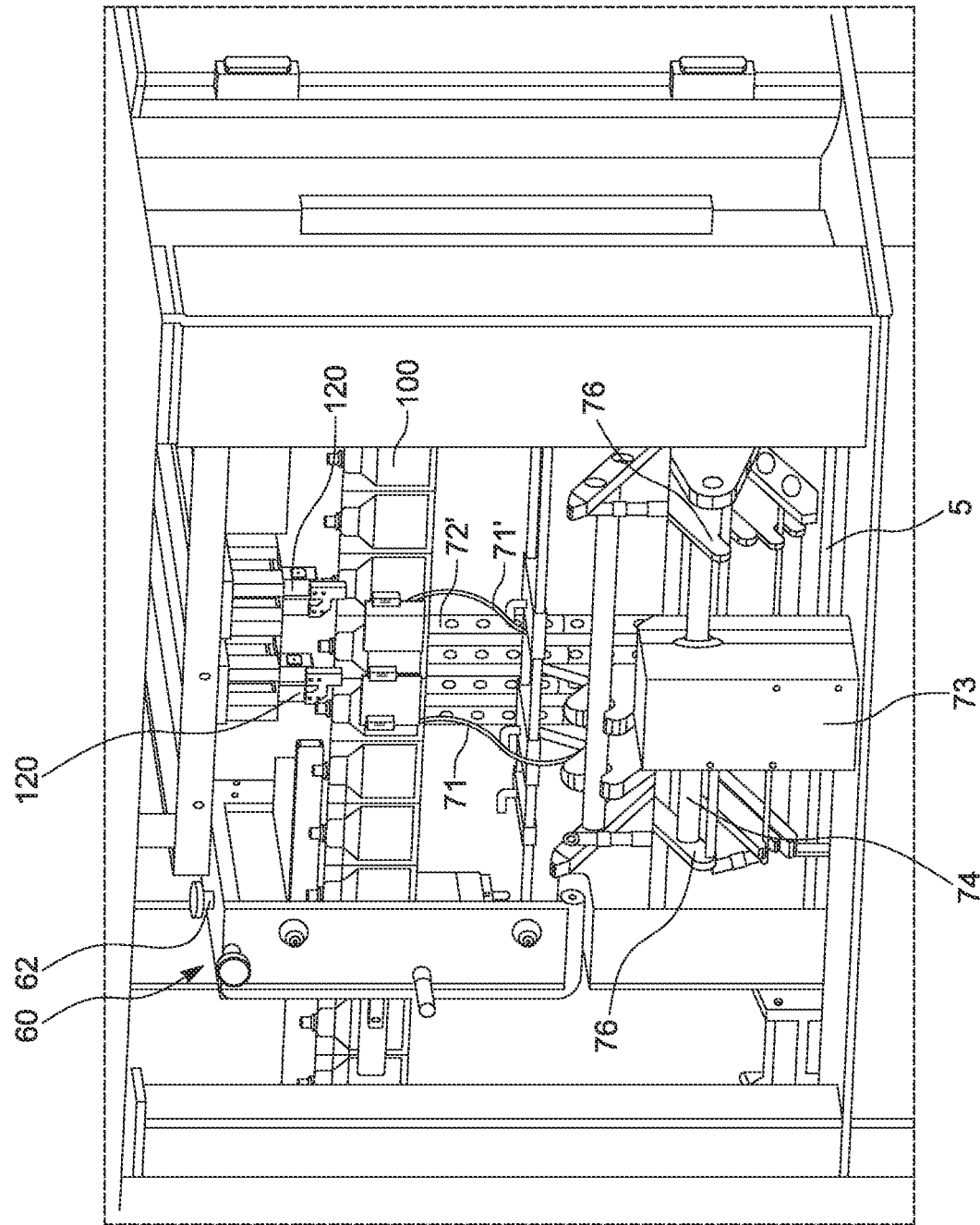
Figure 8:
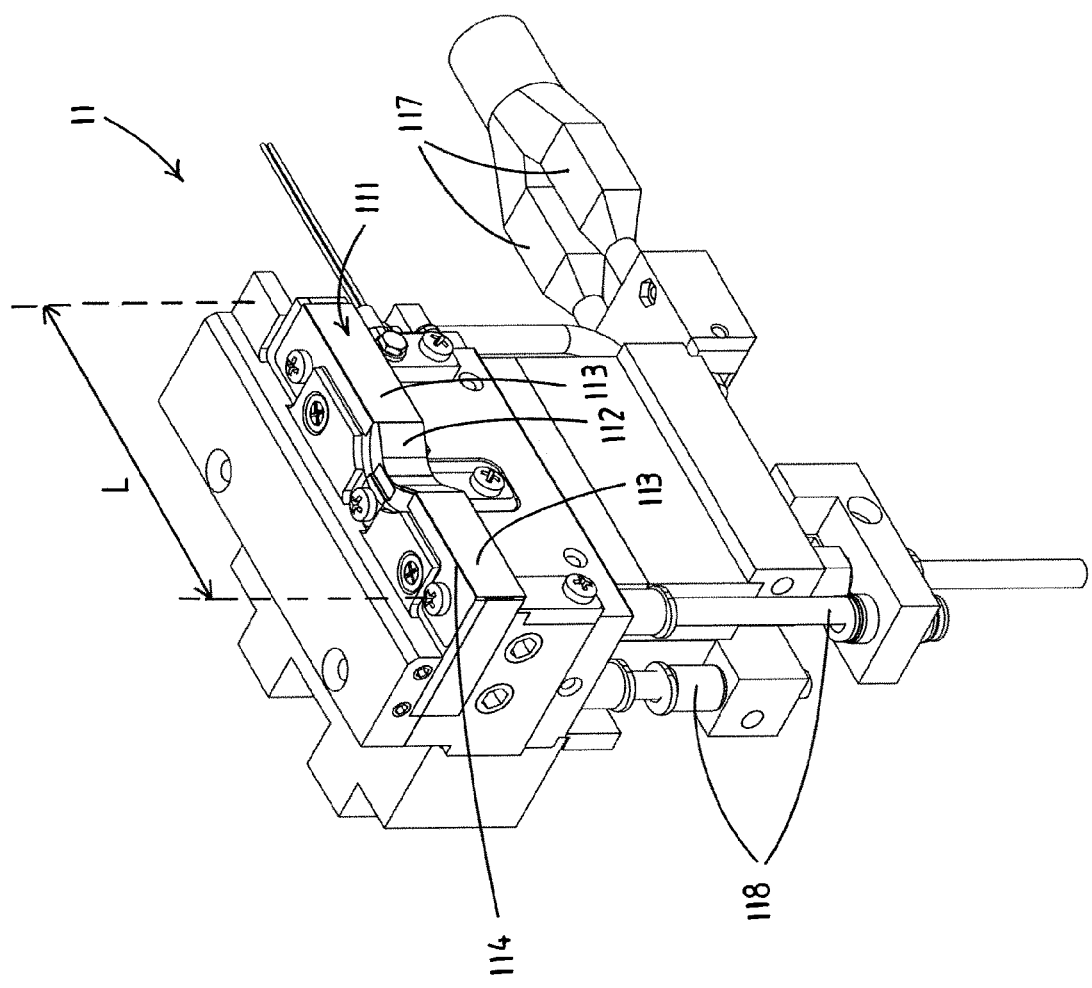
Figure 9:
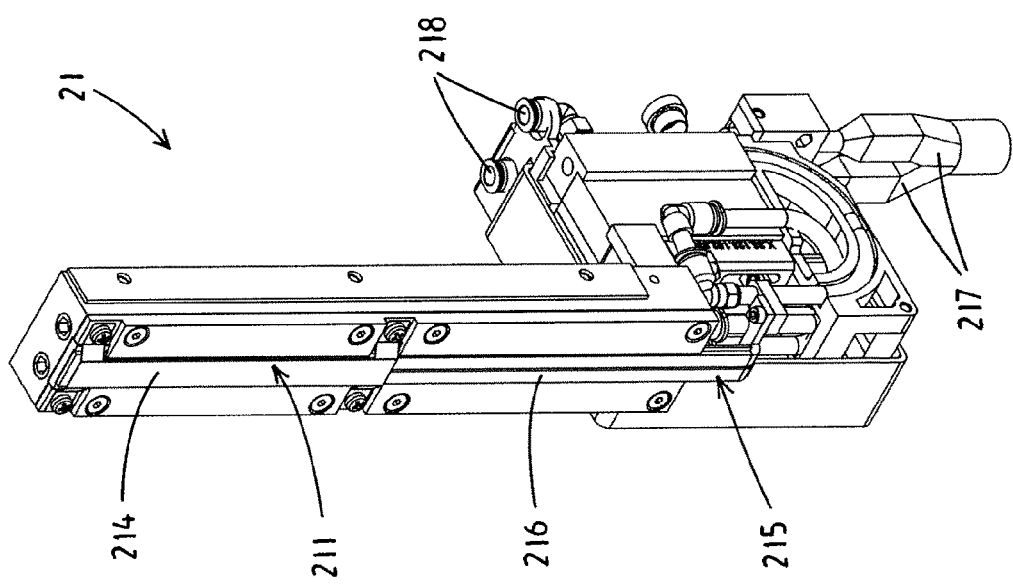
Figure 10:
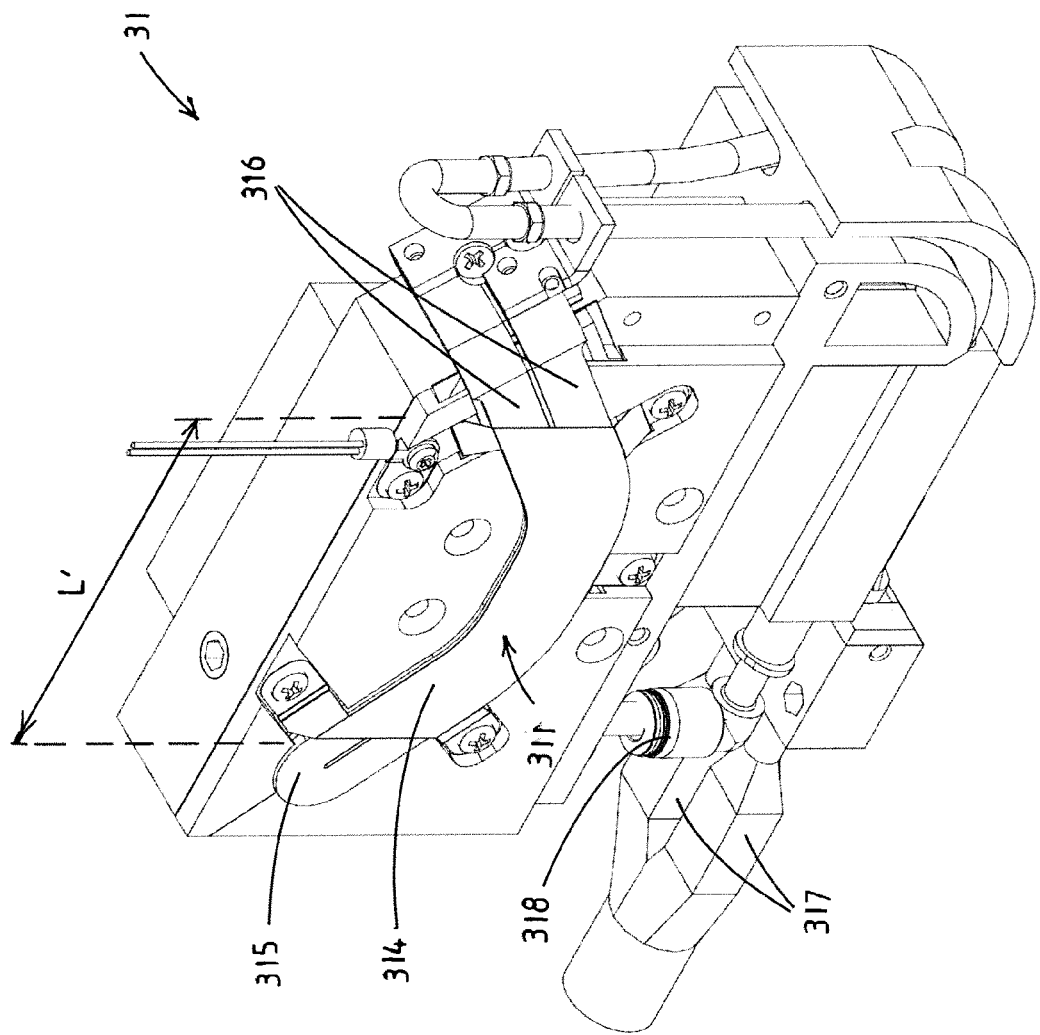
Figure 11:
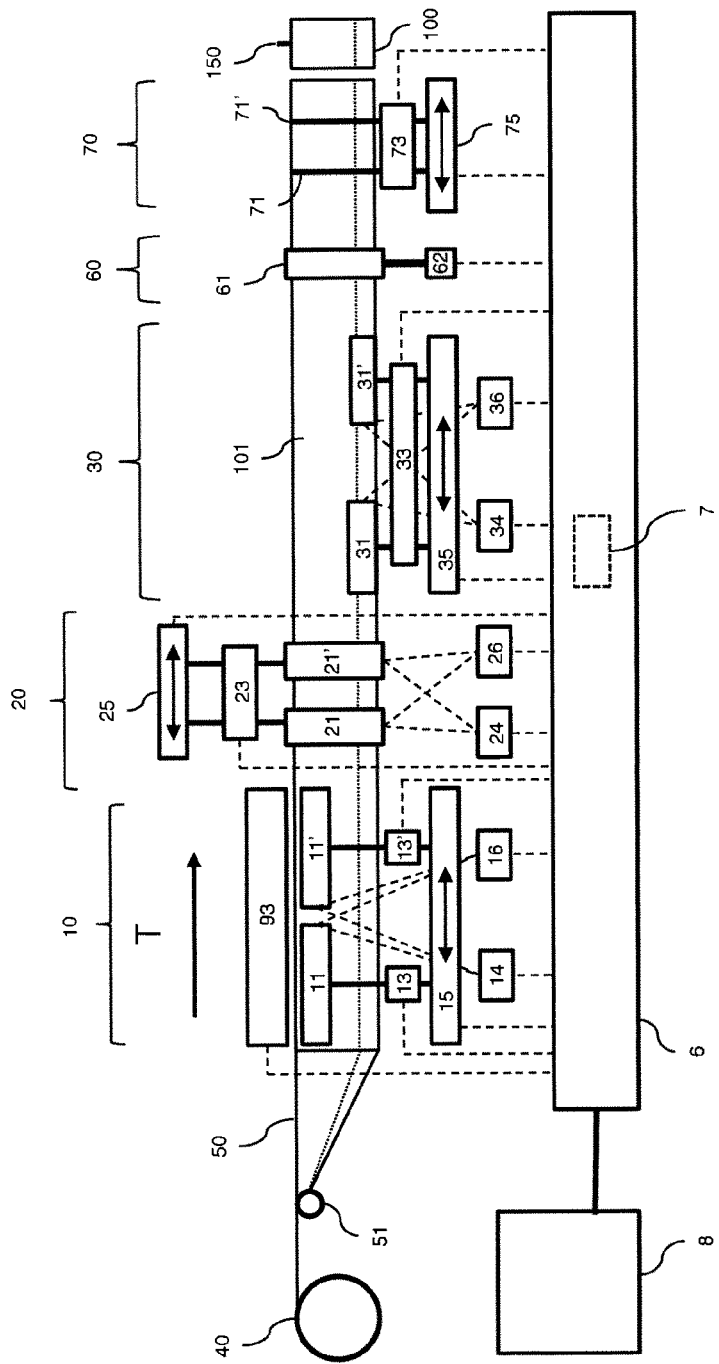
Figure 12:
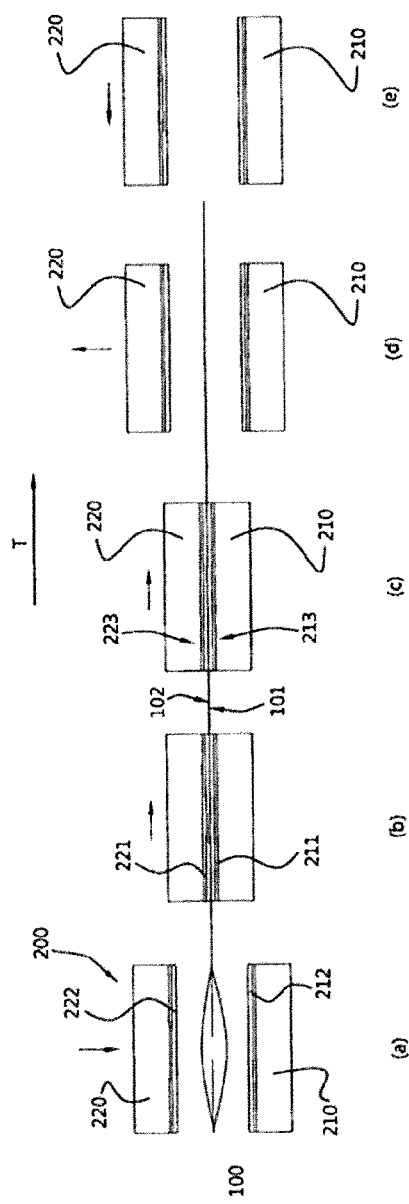

It is shown in FIG. 13, that the susceptor element 114 is a strip, e.g. of a metal, e.g. of aluminium, wherein the height of the strip is between 3 and 10 millimetres, e.g. between 4 and 8 millimeters. It is shown in FIG. 4, that the strip has a constant height over its length.

In an alternative embodiment, the height of the susceptor element may be non-constant. For example, a lower edge of a susceptor element in a jaw of a fitment sealing station may be upwardly curved in a central, e.g. at a part that is configured to abut an attachment portion of a fitment during use, to effect that lees heat is transferred to a lower edge of the attachment portion and the air below. This improves the rate at which the seal can be cooled, since the air would otherwise act as an insulator, e.g. reducing the cooling rate.

It is shown in FIG. 13, that the susceptor element 114 strip lacks apertures over its extension.

It is shown in FIG. 13, that the jaw 11 is provided with a single continuous susceptor element 114 embodied as a strip, e.g. of metal.

It is shown in FIG. 13, that the susceptor element 114, e.g. embodied as a strip, has a thickness of between 0.01 and 5 mm, preferably between 0.05 and 2 mm, more preferably between 0.08 and 0.8 mm, e.g. of between 0.08 and 0.5 mm. In general, it is considered desirable to have a minimum thickness of the susceptor element in view of the desire to rapid cool the jaw, including the inductor and the susceptor, after termination of the heat impulse. A thin design of the susceptor, contributes to this desire. It is noted that, in contrast to the impulse sealing device addressed in the introduction, no electric current from a current source is passed through the susceptor, so the cross-section need not be designed to deal with such a current flow.

It is shown in FIG. 13, that the jaw 11 is provided with a single continuous susceptor element 114 embodied as a strip, e.g. of metal, having a height of the strip between 3 and 10 millimetres, e.g. between 4 and 8 millimeters, and a thickness of between 0.08 and 0.8 mm, e.g. of between 0.08 and 0.5 mm. For example, the strip is made of aluminium material.

It is shown in FIGS. 13 and 16A-C, that the jaw 11 is embodied such that the high frequency electromagnetic field generated by the inductor 115 primarily causes the very rapid development of heat within a frontal skin layer of the susceptor element 114 due to the so-called skin effect. The skin effect is the tendency of an alternating electric current to become distributed within a conductor such that the current density is largest near the surface of the conductor and decreases, exponentially, with greater depths of the conductor. At high frequencies the skin depth becomes smaller. This depth may, for example, be 0.15 mm for an aluminium susceptor element if the frequency of the field is 350 KHz. The thickness of the susceptor element is envisaged to be more than this skin depth, yet not too much for the reason addressed herein.

It is shown in FIG. 13, that the spacing between the rear of the susceptor element 114 and the neighbouring inductor sections 115a, b is at a minimum 0.025 mm, or 0.05 mm, or 0.1 mm and at a maximum 3.0 mm, or 2.0 mm, or 1.0 mm. The minimum values of this spacing are primarily envisaged to allow for effective electrical insulation between the inductor section(s) on the one hand and the susceptor element on the other hand. In embodiments, it is envisaged that this spacing is only filled with electrically insulating material. The maximum value of this spacing is primarily envisaged to have the inductor section(s) in close proximity to the rear of the susceptor element, wherein a maximum of 1.0 mm is preferred. In a practical embodiment this spacing may be 0.05 mm. So this spacing may in practical embodiments be less than the thickness of the susceptor element itself.

Preferably, the entire spacing between the rear of the susceptor element and the neighbouring inductor section(s) is filled with electrically insulating material.

FIG. 14 illustrates that the spacing between the rear of the susceptor element 114 and the neighbouring inductor section 115 is filled with one or more layers of electrically insulating tape, for example at least a layer of Kapton 119a and a layer of Teflon 119b, for example just one layer of Kapton tape and one Layer of Teflon tape.

In an embodiment the electrical insulation between the rear of the susceptor element and the neighbouring inductor section(s) has a thickness of between a minimum of 0.025, or 0.050, or 0.1 mm, and a maximum of at most 3.0 mm, or 2.0 mm.

In an embodiment the anti-stick layer 119c at the front of the jaw 11 is embodied as a layer of Teflon tape. In another embodiment the anti-stick layer could comprises glass or the like.

FIG. 14 illustrates that the front face of the susceptor element 114 is covered by at least one layer of electrically insulating material 119d, e.g. Kapton, e.g. Kapton tape, e.g. having a thickness of between 0.01 and 0.05 mm, e.g. of about 0.025 mm.

In an embodiment the spacing between the front surface of the jaw and the susceptor element is at a minimum 0.025 mm, or 0.050 mm, and at a maximum 2.0 mm, or 1.0 mm, or 0.5 mm. Herein, the minimum spacing may be governed by the presence of an anti-stick layer 119c. The anti-stick layer can be coated onto the jaw, e.g. onto the susceptor element, e.g. a glass or Teflon coating.

In an embodiment, the spacing between the front surface of the jaw and the susceptor element is filled with at least one, e.g. multiple layers of electrically insulating material, e.g. tape, for example at least a layer of Kapton tape 119d and a layer of Teflon tape 119c as anti-stick layer forming the front surface of the jaw, for example just one layer of Kapton tape and one Layer of Teflon tape.

It is shown in FIG. 13, that the contoured front surface of the jaw 11 is smooth in a region of contact with the walls 101, 102 of film material, so lacking any relief that would locally keep the film material away from the front surface, so lacking for example one or more ribs, bosses, etc. This arrangement is preferred in conjunction with a smooth design of the sealing faces of the attachment portion 151. Preferably, the smooth region of contact of the front surface of the jaws is designed to be parallel to the sealing surface of the attachment portion 151 that is to be joined to the walls of film material.

It is shown in FIG. 13, that the jaws 11 are configured, e.g. have a length, so that the entire non-bonded edge region in which the spout 150 is inserted, e.g. by an inserter 93 of the system 1, is sealed in one cycle by the operation of the jaws. So both the spout 150 is secured in the edge region and the entirety of the edge region is sealed closed. This avoids the needs for additional sealing actions along said edge region.

It is shown in FIG. 13, that the recessed face portion of each jaw 11 is curvaceous over its entire longitudinal extension. In another, more preferred embodiment, the recessed face portion of attuned to a diamond shape attachment portion of the fitment. Herein the recessed face portion is formed by a central curved area between two rectilinear areas. This arrangement allows for enhanced intimate contact between the jaw front surface and the film wall and fitment.

It is shown, that both jaws 11 have a main body 11a, e.g. of plastic or ceramic material, e.g. a heat-resistant material, e.g. of PEEK, on/in which the susceptor element and the inductor are mounted. The plastic or ceramic material is selected to not impair the field that is generated by the inductor, at least not in an undesirable manner. Boron nitride, aluminium nitride, polyphenylene sulphide (PPS), and/or vulcanized silicone materials, can be considered as well for the main body. In particular Boron nitride may provide for a good thermal conductivity, thereby enabling a good conductivity of heat from the susceptor element towards the cooling device, e.g. towards the cooling fluid.

One or more cooling ducts 118 are provided, e.g. machined, in the main body of the jaw, e.g. made of PEEK.

For example, one or both jaws 11 have a main body 11a, having a main body front side into which one or more grooves are made in which the one or more induction sections are arranged. In embodiments, the susceptor element is arranged over the main body front side, as discussed herein relative to the one or more inductor sections. Herein, one or more layers of electrically insulation material are arranged between the inductor section(s) and the susceptor elements, e.g. of Kapton and/or Teflon. One or more further layers of electrically insulation material as well as an outer anti-stick covering are mounted over the susceptor element to from the front surface of the jaw.

Figure 15:
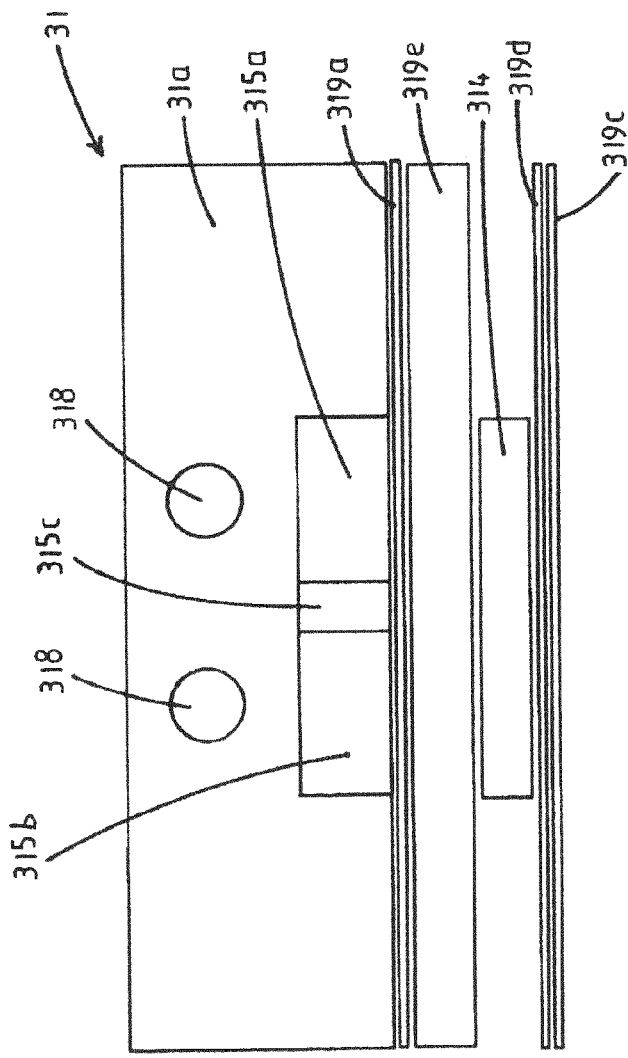
Figure 16A:
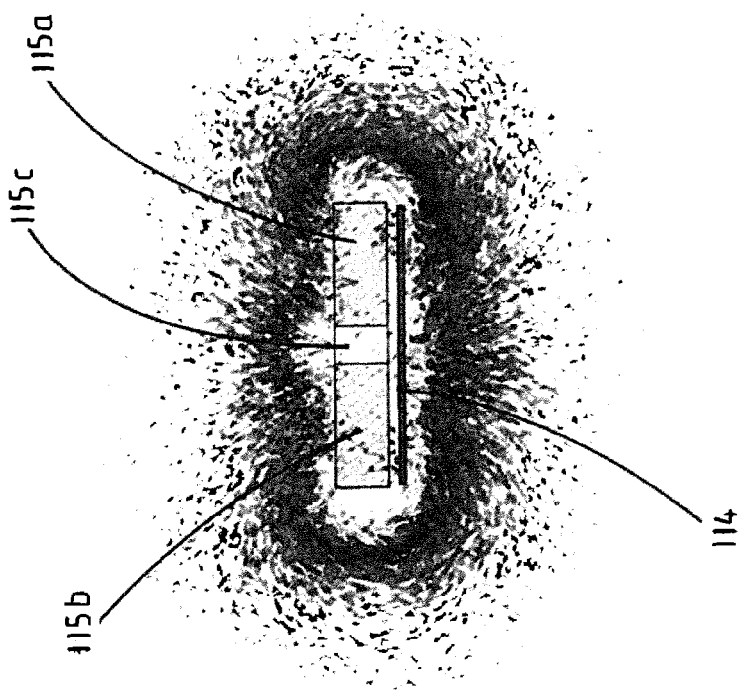
FIG. 16B illustrates the strength and distribution of the field when seen from above onto the front of a jaw, wherein the field is indicate with FLd and is shown in relation to the inductor 115 and susceptor 114.
FIG. 16C illustrates the strength and distribution of the field of FIG. 16B in a perspective view.
Figure 16B:
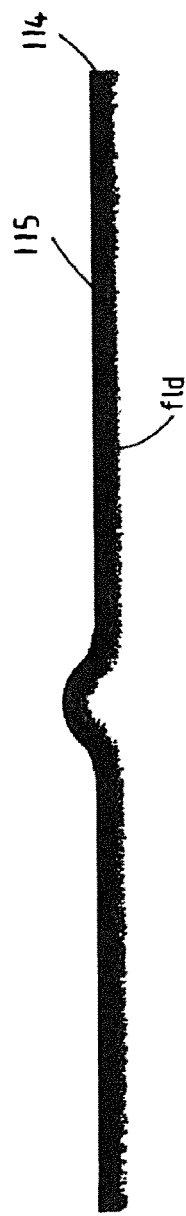
Figure 16C:
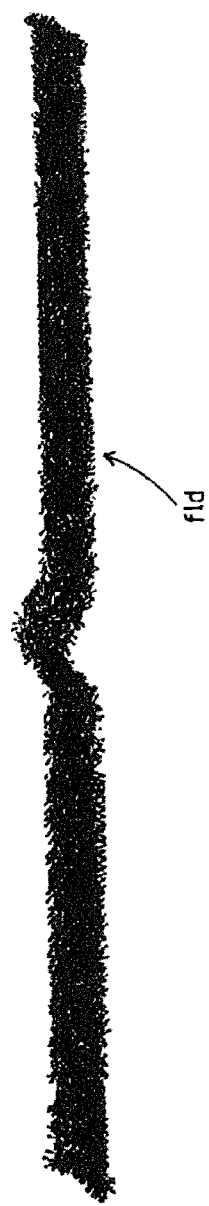

FIG. 15 illustrates a jaw 31 of the bottom region sealing station 30 that in case of a pouch 100 with one or more side gussets, the edge region where the seal is to be made may include a so-called triple point. In such a situation it can be advantageous to provide a resilient backing layer 319e, e.g. of vulcanized silicone rubber and/or Teflon, behind the susceptor element 314, thereby allowing for the jaw front to accommodate for a local variation of the number of film material walls. For example, the resilient layer 319e has a thickness between 0.1 and 2.0 millimetre. Herein it is understood that the thin susceptor element 314 is able to flex so as to accommodate the local variation in the number of walls.

The invention claimed is:

1. A sealing system for heat sealing of heat-sealable film material,
    wherein the sealing system comprises:
        an infeed section comprising a roll handling station that is configured to receive one or more rolls of heat-sealable film material, which infeed section is configured to dispense superimposed walls of heat-sealable film material unwound from the one or more rolls,
        a sealing section downstream of the infeed section and comprising a sealing station for the superimposed walls dispensed from the infeed section,
        a film material drive station downstream of the sealing section, which film material drive station is configured to pull the superimposed walls of heat-sealable film material past the sealing station,
    wherein the sealing station comprises:
        a sealing device comprising a first jaw and a second jaw,
        an actuator device that is configured to move the first and second jaws relative to one another between an opened position and a clamped position,
    wherein the first jaw has a first front surface configured to contact a respective first wall of heat-sealable material, and wherein the second jaw has a second front surface configured to contact a respective second wall of heat-sealable material, wherein at least the first jaw comprises at a heatable member for heat sealing a region of the superimposed walls of heat-sealable film material when clamped between the first and second jaws, a motion device that is configured to move the first and second jaws in synchronicity with the superimposed walls when clamped between the first and second jaws, characterized in that, at least the first jaw of the sealing station comprises at the respective front surface thereof at least one heatable member embodied as a susceptor element comprising electrically conductive material, which impulse heatable member extends along the respective front surface, and in that, for the pair of first and second jaws of the sealing station, at least one of the jaws thereof comprises an inductor, and in that the system comprises a high frequency electric current source which is connected to the inductor, and in that the system comprises a cooling device that is configured to continuously cool at least one of the first and second jaws of the sealing station, and in that the cooling device comprises one or more cooling ducts in said at least one of the first and second jaws of the sealing station, and in that the one or more cooling ducts are arranged at one or both of a rear side of the inductor and a rear side of the susceptor, and in that the cooling device is configured to establish a continuous circulation of liquid coolant through the one or more cooling ducts, and in that the sealing station is configured to perform an integrated impulse sealing and cooling cycle, wherein the actuator device is operated to move the first and second jaws into the clamped position in which the first and second walls are clamped by the first and second jaws, and wherein, in the clamped position, the high frequency electric current source temporarily feeds a high frequency electric current to the inductor, thereby generating a high frequency electromagnetic field with the inductor, wherein the high frequency electromagnetic field induces eddy currents in the susceptor element generating an impulse of heat that is emitted by the susceptor element, which impulse of heat has a heat impulse duration and seals the region of the first and second walls to each other or onto a fitment when present, wherein after termination of the feeding of high frequency electric current to the inductor the at least one of the first and second jaws as well as the sealed region are effectively cooled by the cooling device during a clamped cooling duration whilst the respective first and second jaws remain in the clamped position, and wherein the actuator device is operated to move the first and second jaws into the opened position after the clamped cooling duration.

2. The sealing system according to claim 1, wherein the sealing system further comprises a control unit which is associated with the sealing station.

3. The sealing system according to claim 2, wherein the control unit is in conjunction with the cooling device, configured to control the cooling rate of at least one of the first and second jaws as well as of the region that is sealed by the sealing station.

4. The sealing system according to claim 2, wherein the control unit is configured to control the feeding of high frequency electric current to the inductor and thereby the impulse of heat emitted by the susceptor element.

5. The sealing system according to claim 2, wherein the control unit configured to control the actuator device for moving the first and second jaws relative to one another between the opened position and the clamped position allowing to control the duration of the clamped position of the first and second jaws and thereby the clamped cooling duration.

6. The sealing system according to claim 1, wherein each of the first and second jaws of the sealing station comprises a susceptor element comprising electrically conductive material as well as an associated inductor.

7. The sealing system according to claim 1, wherein the susceptor element extends along the front surface of the respective jaw and has a rear side, and wherein each inductor comprises an elongated inductor section that extends at the rear side of the respective susceptor.

8. The sealing system according to claim 1, wherein the inductor of a jaw comprises multiple elongated inductor sections that are parallel to one another, and wherein adjacent inductor sections are spaced from one another by a slit, and wherein the susceptor element, seen in a view onto the front surface of the jaw, extends over the one or more slits.

9. The sealing system according to claim 1, wherein the cooling device is configured to establish a continuous circulation of liquid coolant through one or more cooling ducts arranged in the first jaw and/or in the second jaw.

10. The sealing system according to claim 1, wherein the infeed section comprises a folding station that is configured to fold film material dispensed from a single roll into two superimposed walls.

11. The sealing system according to claim 2, wherein the control unit is configured to control the motion device for moving the first and second jaws in synchronicity with the superimposed walls when clamped between the first and second jaws.

12. The sealing system according to claim 1, wherein the sealing section is provided with a trimming station, wherein the trimming station comprises:
a trimming device configured to perform on command a trimming action in order to remove a portion of the superimposed,
a motion device that is configured to move trimming device in synchronicity with the superimposed walls when performing the trimming action,
a collection system configured to remove the trimmed portions.

13. A production machine for the production of collapsible pouches, said pouches each having walls made from heat-sealable film material, wherein the production machine comprises the sealing system according to claim 1.

14. The production machine according to claim 13, wherein the machine is configured to the production of pouches having a fitment comprising multiple of the sealing stations along a path for the superimposed walls dispensed from the infeed section, and wherein the first sealing station along the path is configured as a fitment sealing station adapted to heat seal a fitment onto the superimposed walls, and wherein one or more downstream sealing stations are configured to seal one or more other regions of the pouch, and/or a bottom seal region of the pouch.

15. The production machine according to claim 13, wherein the machine comprises a fitment inserting device that is adapted to insert an attachment portion of a fitment in a non-bonded edge region between the opposed walls and wherein the fitment sealing station is configured to heat seal the walls to the attachment portion of the fitment.

16. The production machine according to claim 13, wherein the path is horizontal, and wherein the infeed section is configured to fold film material dispensed from a single roll into two superimposed walls, wherein the superimposed walls are in vertical orientation when supplied to the sealing section with a non-bonded top edge region between the opposed walls and a fold along a bottom of the opposed walls, wherein the fitment inserting device is adapted to insert an attachment portion of a fitment in the non-bonded top edge region between the opposed walls, and wherein the motion device of associated sealing station is mounted below the path.

17. The production machine according to claim 13, wherein the machine comprises a cutting station that is arranged downstream of the film material drive station and is configured to make one or more cuts in order to create individual pouches.

18. A process for heat sealing of heat-sealable film material, wherein use is made of the sealing system according to claim 1 and/or the pouch production machine according to claim 13, the process comprising the steps of:
dispensing superimposed walls of heat-sealable film material with the infeed section,
pulling the superimposed walls of heat-sealable film material past the sealing station with the film material drive station, and
performing an integrated impulse sealing and cooling cycle with the sealing station.

19. The process according to claim 18, wherein the film material is a single-polymer heat-sealable film material made from polyethylene (PE), or polypropylene (PP), or polyethylene terephthalate (PET), wherein any metal layer is absent in the film material.

20. The process according to claim 18 in the production of pouches with the sealing system and/or the production machine comprising multiple of the sealing stations along a path for the superimposed walls dispensed from the infeed section, wherein pouches having a fitment are produced, and wherein the first sealing station along the path is configured as a fitment sealing station to heat seal a fitment onto one or both of the superimposed walls, and wherein one or more downstream sealing stations are configured to seal one or more other regions of the pouch, and wherein the film material is made entirely from polyethylene (PE.

21. The process according to claim 18, wherein film material is printed on the side that is contacted by the respective jaw of the sealing station having an impulse heatable member.

* * * * *